(12) United States Patent  (10) Patent No.: US 8,068,300 B2
Dugas  (45) Date of Patent: Nov. 29, 2011

(54) THIN FILM PLANAR ARBITRARY GAP PATTERN MAGNETIC HEAD

(75) Inventor: Matthew P. Dugas, St. Paul, MN (US)

(73) Assignee: Advanced Research Corporation, White Bear Lake, MN (US)

( * ) Notice: Subject to any disclaimer, the term of this patent is extended or adjusted under 35 U.S.C. 154(b) by 76 days.

(21) Appl. No.: 12/414,604

(22) Filed: Mar. 30, 2009

(65) Prior Publication Data

US 2010/0027153 A1 Feb. 4, 2010

Related U.S. Application Data

(60) Provisional application No. 61/040,373, filed on Mar. 28, 2008.

(51) Int. Cl.
G11B 5/09 (2006.01)
(52) U.S. Cl. .............................. 360/48; 360/75; 360/110
(58) Field of Classification Search .................. None
See application file for complete search history.

(56) References Cited

U.S. PATENT DOCUMENTS

| | | | |
|---|---|---|---|
| 2,938,962 | A | 5/1960 | Konins et al. |
| 3,192,608 | A | 7/1965 | Rinia et al. |
| 3,417,386 | A | 12/1968 | Schneider |
| 3,699,334 | A | 10/1972 | Cohen et al. |
| 3,750,828 | A | 8/1973 | Constable |
| 3,853,715 | A | 12/1974 | Romankiw |
| 4,007,493 | A | 2/1977 | Behr et al. |
| 4,088,490 | A | 5/1978 | Duke et al. |
| 4,268,881 | A | 5/1981 | Saito |
| 4,298,899 | A | 11/1981 | Argumedo et al. |
| 4,314,290 | A | 2/1982 | Ragle |
| 4,318,146 | A | 3/1982 | Ike et al. |
| 4,408,240 | A | 10/1983 | Pastore |
| 4,457,803 | A | 7/1984 | Takigawa |
| 4,488,188 | A | 12/1984 | Hansen et al. |

(Continued)

FOREIGN PATENT DOCUMENTS

DE 2912309 10/1979

(Continued)

OTHER PUBLICATIONS

Hisatoshi, Hata, Patent Abstracts of Japan (Publication No. 06333210), Feb. 12, 1994.

(Continued)

*Primary Examiner* — Jason Olson
(74) *Attorney, Agent, or Firm* — Dorsey & Whitney LLP; Nathan J. Witzany, Esq.

(57) ABSTRACT

Planar magnetic heads and methods of making the same using a built-up approach and thru-hole via technology to achieve a true planar head. A head may comprise a substrate having conductive thru-hole vias extending therethrough, a first magnetic layer deposited and patterned on the substrate, a first insulation layer deposited and patterned on the first magnetic layer, a conductive coil layer deposited and patterned on the first insulation layer and connected to the conductive thru-hole vias, a second insulation layer deposited and patterned on the conductive coil layer, vias patterned into the insulation layer extending to the first magnetic layer, a second magnetic layer deposited in the vias, and a third magnetic layer deposited and patterned on the second insulation layer and second magnetic layer. The third magnetic layer may be connected to the first magnetic layer through the second magnetic layer deposited in the vias of the insulation layers.

14 Claims, 25 Drawing Sheets

U.S. PATENT DOCUMENTS

| | | | |
|---|---|---|---|
| 4,490,756 A | 12/1984 | Dost et al. | |
| 4,535,376 A | 8/1985 | Nomura et al. | |
| 4,539,615 A | 9/1985 | Arai et al. | |
| 4,586,094 A | 4/1986 | Chambors et al. | |
| 4,598,327 A | 7/1986 | Jen et al. | |
| 4,609,959 A | 9/1986 | Rudi | |
| 4,642,709 A | 2/1987 | Vinal | |
| 4,673,999 A | 6/1987 | Suyama et al. | |
| 4,685,012 A | 8/1987 | DeWit et al. | |
| 4,752,850 A | 6/1988 | Yamada et al. | |
| 4,758,304 A | 7/1988 | McNeil et al. | |
| 4,758,907 A | 7/1988 | Okamoto et al. | |
| 4,837,924 A | 6/1989 | Lazzari | |
| 4,897,748 A | 1/1990 | Takahashi et al. | |
| 4,901,178 A | 2/1990 | Kobayashi et al. | |
| 4,906,552 A | 3/1990 | Ngo et al. | |
| 4,914,805 A | 4/1990 | Kawase | |
| 4,927,804 A | 5/1990 | Zieren et al. | |
| 4,945,438 A | 7/1990 | Matsumoto et al. | |
| 4,971,947 A | 11/1990 | Barnes et al. | |
| 4,992,897 A | 2/1991 | Deroux-Dauphin | |
| 5,016,342 A | 5/1991 | Pisharody et al. | |
| 5,017,326 A | 5/1991 | Wash et al. | |
| 5,027,244 A | 6/1991 | Hayakawa | |
| 5,035,787 A | 7/1991 | Parker et al. | |
| 5,055,951 A | 10/1991 | Behr | |
| 5,067,230 A | 11/1991 | Meunier et al. | |
| 5,079,663 A | 1/1992 | Ju et al. | |
| 5,086,015 A | 2/1992 | Itoh et al. | |
| 5,090,111 A | 2/1992 | Lazzari | |
| 5,093,980 A | 3/1992 | Maurice et al. | |
| 5,124,869 A | 6/1992 | Lehureau | |
| 5,126,231 A | 6/1992 | Levy | |
| 5,132,861 A | 7/1992 | Behr et al. | |
| 5,160,078 A | 11/1992 | Spicer | |
| 5,189,580 A | 2/1993 | Pisharody et al. | |
| 5,195,006 A | 3/1993 | Morikawa | |
| 5,196,969 A | 3/1993 | Iwamatsu et al. | |
| 5,211,734 A | 5/1993 | Yagami et al. | |
| 5,224,260 A | 7/1993 | Fedeli et al. | |
| 5,241,442 A | 8/1993 | Akashi | |
| 5,262,908 A | 11/1993 | Iwamatsu et al. | |
| 5,280,402 A | 1/1994 | Anderson et al. | |
| 5,293,281 A | 3/1994 | Behr et al. | |
| 5,301,418 A | 4/1994 | Dirne et al. | |
| 5,307,217 A | 4/1994 | Saliba | |
| 5,309,299 A | 5/1994 | Crossland et al. | |
| 5,319,502 A | 6/1994 | Feig | |
| 5,321,570 A | 6/1994 | Behr et al. | |
| 5,371,638 A | 12/1994 | Saliba | |
| 5,379,170 A | 1/1995 | Schwarz | |
| 5,394,285 A | 2/1995 | Dee et al. | |
| 5,398,145 A | 3/1995 | Jeffers et al. | |
| 5,402,295 A | 3/1995 | Suzuki et al. | |
| 5,405,734 A | 4/1995 | Aita | |
| 5,423,116 A | 6/1995 | Sundaram | |
| 5,432,652 A | 7/1995 | Comeaux et al. | |
| 5,434,732 A | 7/1995 | Schwarz et al. | |
| 5,447,598 A | 9/1995 | Mihara et al. | |
| 5,450,257 A | 9/1995 | Tran et al. | |
| 5,452,152 A | 9/1995 | Rudi | |
| 5,452,165 A | 9/1995 | Chen et al. | |
| 5,452,166 A | 9/1995 | Aylwin et al. | |
| 5,488,525 A | 1/1996 | Adams et al. | |
| 5,504,339 A | 4/1996 | Masuda | |
| 5,506,737 A | 4/1996 | Lin et al. | |
| 5,523,185 A | 6/1996 | Goto | |
| 5,523,904 A | 6/1996 | Saliba | |
| 5,552,944 A | 9/1996 | Clemow | |
| 5,567,333 A | 10/1996 | Hira et al. | |
| 5,572,392 A | 11/1996 | Aboaf et al. | |
| 5,587,307 A | 12/1996 | Alborn, Jr. et al. | |
| 5,593,065 A | 1/1997 | Harrold | |
| 5,602,703 A | 2/1997 | Moore et al. | |
| 5,606,478 A | 2/1997 | Chen et al. | |
| 5,616,921 A | 4/1997 | Talbot et al. | |
| 5,621,188 A | 4/1997 | Lee et al. | |
| 5,629,813 A | 5/1997 | Baca et al. | |
| 5,639,509 A | 6/1997 | Schemmel | |
| 5,652,015 A | 7/1997 | Aboaf et al. | |
| 5,655,286 A | 8/1997 | Jones, Jr. | |
| 5,665,251 A | 9/1997 | Robertson et al. | |
| 5,666,249 A | 9/1997 | Ohmori et al. | |
| 5,675,461 A | 10/1997 | Aylwin et al. | |
| 5,677,011 A | 10/1997 | Hatakeyama et al. | |
| 5,680,278 A | 10/1997 | Sawtelle, Jr. | |
| 5,689,384 A | 11/1997 | Albrecht et al. | |
| 5,710,673 A | 1/1998 | Varian | |
| 5,715,597 A | 2/1998 | Aylwin et al. | |
| 5,719,730 A | 2/1998 | Chang et al. | |
| 5,723,234 A | 3/1998 | Yokoyama et al. | |
| 5,726,841 A | 3/1998 | Tong et al. | |
| 5,737,826 A | 4/1998 | Slade et al. | |
| 5,742,452 A | 4/1998 | Simmons et al. | |
| 5,751,526 A | 5/1998 | Schemmel | |
| 5,752,309 A | 5/1998 | Partee et al. | |
| 5,757,575 A | 5/1998 | Hallamasek et al. | |
| 5,768,070 A | 6/1998 | Krounbi et al. | |
| 5,771,142 A | 6/1998 | Maurice et al. | |
| 5,793,577 A | 8/1998 | Katz et al. | |
| 5,822,159 A | 10/1998 | Fukuyama et al. | |
| 5,831,792 A | 11/1998 | Ananth | |
| 5,863,450 A | 1/1999 | Dutertre et al. | |
| 5,867,339 A | 2/1999 | Panish et al. | |
| 5,890,278 A | 4/1999 | Van Kesteren | |
| 5,909,346 A | 6/1999 | Malhotra et al. | |
| 5,920,447 A | 7/1999 | Sakata et al. | |
| 5,923,272 A | 7/1999 | Albrecht et al. | |
| 5,930,065 A | 7/1999 | Albrecht et al. | |
| 5,940,238 A | 8/1999 | Nayak et al. | |
| 5,966,264 A | 10/1999 | Belser et al. | |
| 5,966,632 A | 10/1999 | Chen et al. | |
| 5,973,874 A | 10/1999 | Panish et al. | |
| 5,982,711 A | 11/1999 | Knowles et al. | |
| 5,995,315 A | 11/1999 | Fasen | |
| 6,005,737 A | 12/1999 | Connolly et al. | |
| 6,018,444 A | 1/2000 | Beck et al. | |
| 6,021,013 A | 2/2000 | Albrecht et al. | |
| 6,025,970 A | 2/2000 | Cheung | |
| 6,031,673 A | 2/2000 | Fasen et al. | |
| 6,034,835 A | 3/2000 | Serrano | |
| 6,075,678 A | 6/2000 | Saliba | |
| 6,081,401 A | 6/2000 | Varian | |
| 6,088,184 A | 7/2000 | Hu | |
| 6,090,507 A | 7/2000 | Grenon et al. | |
| 6,111,719 A | 8/2000 | Fasen | |
| 6,118,630 A | 9/2000 | Argumedo | |
| 6,130,804 A | 10/2000 | Panish et al. | |
| 6,141,174 A | 10/2000 | Judge et al. | |
| 6,156,487 A | 12/2000 | Jennison et al. | |
| 6,163,421 A | 12/2000 | Shinpuku et al. | |
| 6,163,436 A | 12/2000 | Sasaki et al. | |
| 6,165,649 A | 12/2000 | Grenon et al. | |
| 6,169,640 B1 | 1/2001 | Fasen | |
| 6,190,836 B1 | 2/2001 | Grenon et al. | |
| 6,222,698 B1 | 4/2001 | Barndt et al. | |
| 6,229,669 B1 | 5/2001 | Beck et al. | |
| 6,236,525 B1 | 5/2001 | Cates et al. | |
| 6,236,538 B1 | 5/2001 | Yamada et al. | |
| 6,269,533 B2 | 8/2001 | Dugas | |
| 6,275,350 B1 | 8/2001 | Barndt | |
| 6,282,051 B1 | 8/2001 | Albrecht et al. | |
| 6,307,718 B1 | 10/2001 | Kasetty | |
| 6,320,719 B1 | 11/2001 | Albrecht et al. | |
| 6,433,949 B1 | 8/2002 | Murphy et al. | |
| 6,445,550 B1 | 9/2002 | Ishi | |
| 6,462,904 B1 | 10/2002 | Albrecht et al. | |
| 6,469,867 B2 | 10/2002 | Saliba | |
| 6,496,328 B1 | 12/2002 | Dugas | |
| 6,542,325 B1 | 4/2003 | Molstad et al. | |
| 6,545,837 B1 | 4/2003 | Tran | |
| 6,574,066 B1 | 6/2003 | Stubbs et al. | |
| 6,590,729 B1 | 7/2003 | Akagi et al. | |
| 6,622,490 B2 | 9/2003 | Ingistov | |
| 6,635,404 B1 | 10/2003 | Choi et al. | |
| 6,650,496 B2 | 11/2003 | Nozieres et al. | |
| 6,700,729 B1 | 3/2004 | Beck et al. | |

| | | |
|---|---|---|
| 6,712,985 B2 | 3/2004 | Biskeborn |
| 6,721,126 B1 | 4/2004 | Bui et al. |
| 6,744,594 B2 | 6/2004 | Denison et al. |
| 6,754,026 B1 | 6/2004 | Koski |
| 6,778,359 B1 | 8/2004 | Iwama |
| 6,781,778 B1 | 8/2004 | Molstad et al. |
| 6,795,246 B2 | 9/2004 | Yano et al. |
| 6,798,608 B2 | 9/2004 | Chliwnyj et al. |
| 6,801,383 B2 | 10/2004 | Zweighaft et al. |
| 6,801,391 B2 | 10/2004 | Sugawara et al. |
| 6,831,805 B2 | 12/2004 | Chliwnyj et al. |
| 6,842,305 B2 | 1/2005 | Molstad et al. |
| 6,865,050 B2 | 3/2005 | Nakao et al. |
| 6,873,487 B2 | 3/2005 | Molstad |
| 6,879,457 B2 | 4/2005 | Eaton et al. |
| 6,894,869 B2 | 5/2005 | Dugas |
| 6,943,987 B1 | 9/2005 | Raymond et al. |
| 6,947,247 B2 | 9/2005 | Schwarz et al. |
| 6,947,256 B2 * | 9/2005 | Biskeborn et al. ........ 360/125.34 |
| 6,950,277 B1 | 9/2005 | Nguy et al. |
| 6,963,467 B2 | 11/2005 | Bui et al. |
| 6,970,312 B2 | 11/2005 | Yip et al. |
| 6,987,648 B2 | 1/2006 | Dugas |
| 6,989,950 B2 | 1/2006 | Ohtsu |
| 6,989,960 B2 | 1/2006 | Dugas |
| 7,009,810 B2 | 3/2006 | Dugas |
| 7,072,133 B1 | 7/2006 | Yip et al. |
| 7,106,544 B2 | 9/2006 | Dugas et al. |
| 7,119,976 B2 * | 10/2006 | Biskeborn et al. ............... 360/53 |
| 7,130,140 B1 | 10/2006 | Boyer |
| 7,130,152 B1 | 10/2006 | Raymond et al. |
| 7,142,388 B2 | 11/2006 | Tateishi et al. |
| 7,170,702 B2 | 1/2007 | Ohtsu |
| 7,190,551 B2 | 3/2007 | Suda |
| 7,196,870 B2 | 3/2007 | Dugas |
| 7,206,170 B2 | 4/2007 | Yip |
| 7,218,476 B2 | 5/2007 | Dugas |
| 7,224,544 B2 | 5/2007 | Takano et al. |
| 7,283,317 B2 | 10/2007 | Dugas et al. |
| 7,301,716 B2 | 11/2007 | Dugas et al. |
| 7,322,096 B2 | 1/2008 | Biskeborn et al. |
| 7,426,093 B2 | 9/2008 | Dugas |
| 7,450,341 B2 | 11/2008 | Dugas et al. |
| 7,511,908 B2 | 3/2009 | Winarski |
| 7,515,374 B2 | 4/2009 | Nakao |
| 7,525,761 B2 | 4/2009 | Dugas |
| 7,639,448 B2 | 12/2009 | Haustein |
| 7,679,858 B2 | 3/2010 | Winarski et al. |
| 7,710,675 B2 | 5/2010 | Dugas et al. |
| 7,773,340 B2 | 8/2010 | Dugas |
| 2001/0003862 A1 | 6/2001 | Dugas |
| 2001/0045005 A1 | 11/2001 | Dugas |
| 2002/0034042 A1 | 3/2002 | Hungerford et al. |
| 2002/0058204 A1 | 5/2002 | Khojasteh et al. |
| 2002/0061465 A1 | 5/2002 | Hasegawa et al. |
| 2002/0125289 A1 | 9/2002 | Huetter |
| 2002/0171974 A1 | 11/2002 | Dugas |
| 2002/0177066 A1 | 11/2002 | Song et al. |
| 2003/0011922 A1 | 1/2003 | Nozieres et al. |
| 2003/0016446 A1 | 1/2003 | Yano |
| 2003/0039063 A1 | 2/2003 | Dugas |
| 2003/0048563 A1 | 3/2003 | Magnusson |
| 2003/0093894 A1 | 5/2003 | Dugas |
| 2003/0099057 A1 | 5/2003 | Molstad |
| 2003/0099059 A1 | 5/2003 | Nakao |
| 2003/0137768 A1 | 7/2003 | Chliwnyj et al. |
| 2003/0151844 A1 | 8/2003 | Eaton et al. |
| 2004/0001275 A1 | 1/2004 | Chliwnyj et al. |
| 2004/0109261 A1 | 6/2004 | Dugas |
| 2004/0145827 A1 | 7/2004 | Biskeborn et al. |
| 2004/0174628 A1 | 9/2004 | Schwarz et al. |
| 2005/0007323 A1 | 1/2005 | Appelbaum et al. |
| 2005/0052779 A1 | 3/2005 | Nakao et al. |
| 2005/0052783 A1 | 3/2005 | Suda |
| 2005/0099713 A1 | 5/2005 | Molstad et al. |
| 2005/0099715 A1 | 5/2005 | Yip et al. |
| 2005/0152066 A1 | 7/2005 | Yip |
| 2005/0168869 A1 | 8/2005 | Dugas et al. |
| 2005/0180040 A1 | 8/2005 | Dugas et al. |
| 2005/0219734 A1 | 10/2005 | Rothermel et al. |
| 2005/0235483 A1 | 10/2005 | Biskeborn et al. |
| 2005/0254170 A1 | 11/2005 | Dugas et al. |
| 2005/0259364 A1 | 11/2005 | Yip |
| 2005/0275968 A1 | 12/2005 | Dugas |
| 2005/0286160 A1 | 12/2005 | Bui et al. |
| 2006/0061906 A1 | 3/2006 | Dugas |
| 2006/0126207 A1 | 6/2006 | Johnson et al. |
| 2008/0252357 A1 * | 10/2008 | Biskeborn et al. ............ 327/419 |
| 2009/0097155 A1 | 4/2009 | Dugas |
| 2009/0262452 A1 | 10/2009 | Dugas |
| 2010/0002335 A1 | 1/2010 | Dugas |

FOREIGN PATENT DOCUMENTS

| | | |
|---|---|---|
| EP | 0 407 244 | 1/1991 |
| EP | 0 690 442 | 1/1996 |
| EP | 0 328 104 | 8/1998 |
| EP | 0 913 813 A2 | 5/1999 |
| JP | 53-007219 | 1/1978 |
| JP | 58146011 | 8/1983 |
| JP | 59-008833 | 1/1984 |
| JP | 60-078347 | 4/1985 |
| JP | 61-151667 | 6/1986 |
| JP | 61-174630 | 8/1986 |
| JP | 61-291074 | 12/1986 |
| JP | 01-064104 | 3/1989 |
| JP | 02-094019 | 4/1990 |
| JP | 02-097659 | 4/1990 |
| JP | 02-288530 | 10/1990 |
| JP | 03-078104 | 4/1991 |
| JP | 03-198210 | 8/1991 |
| JP | 03-269804 | 12/1991 |
| JP | 03-324223 | 12/1991 |
| JP | H04-090110 | 3/1992 |
| JP | 04-091317 | 4/1992 |
| JP | 4103009 | 4/1992 |
| JP | 06-035569 | 3/1994 |
| JP | 06-089412 | 3/1994 |
| JP | 07-187016 | 7/1994 |
| JP | 06-243429 | 9/1994 |
| JP | 06-242827 | 10/1994 |
| JP | 06-301926 | 10/1994 |
| JP | 06-333210 | 12/1994 |
| JP | 09-138912 | 5/1997 |
| JP | 09-219006 | 8/1997 |
| JP | 09-219010 | 8/1997 |
| JP | 10-011714 | 1/1998 |
| JP | 10-198918 | 7/1998 |
| JP | H10-269526 | 10/1998 |
| JP | 11-039623 | 2/1999 |
| JP | 11-045402 | 2/1999 |
| JP | 11-242803 | 9/1999 |
| JP | 10-334435 | 12/1999 |
| JP | 11-353609 | 12/1999 |
| JP | 2002-308945 | 10/2002 |
| JP | A-2003-168203 | 6/2003 |
| JP | 2005-063623 | 3/2005 |
| WO | WO 97/05603 | 2/1997 |
| WO | WO 97/40493 | 10/1997 |
| WO | WO 99/50834 | 10/1999 |
| WO | WO 99/67777 | 12/1999 |
| WO | WO 00/51109 | 8/2000 |
| WO | WO 01/50463 | 7/2001 |

OTHER PUBLICATIONS

Yiqun, Li, et al. "Magnetic Properties and Crystal Structure of FeTaAlN Soft Magnetic Materials for MIG Head", (Abstract), Apr. 15, 1996.
Albrecht, Thomas et al. "Time-Based, Track-Following Servos for Linear tape Drives", Data Storage, Oct. 1997.
Monigle, William C. "FIBs Probe and Fix Semiconductor Problems", Test & Measurement World, May 1988.
Fujiii, S. et al., "A Planarization technology using a bias-deposited dielectric film and an etch-backprocess", IEEE Transactions on, vol. 35, Issue 11, Nov. 1988, pp. 1829-1833.
McDermott, Michael, "Head Makers Discovery Focused Ion Beams", Data Storage, Mar. 1998.

R.C. Barrett, et al., "Timing based Track-Following Servo for Linear Tape Systems", IEEE Transactions on Magnetics, vol. 34, No. 4, Jul. 1998, pp. 1872-1877.

IBM TDB "Hybrid Thin R W Head with Bonding by Laser Beam", vol. 19, Issue No. 2, pp. 681-682 (Jul. 1976).

Dee et al., "Advanced Multi-Track Tape Head for High Performance Tape Recording Application", Mar. 1999, IEEE Transactions Magnetics, vol. 35, No. 2, pp. 712-717.

* cited by examiner

THIN FILM PLANAR ARBITRARY GAP PATTERN MAGNETIC HEAD

CROSS-REFERENCE TO RELATED APPLICATIONS

This application claims benefit of priority to U.S. Ser. No. 61/040,373 filed Mar. 28, 2008, the contents of which are herein incorporated by reference.

FIELD OF THE INVENTION

The present disclosure relates to magnetic recording heads and methods of making the same. More particularly, the present disclosure relates to thin film planar arbitrary gap pattern magnetic recording heads and methods of making the same.

BACKGROUND OF THE INVENTION

Prior art magnetic heads are disclosed in U.S. Pat. No. 6,947,256 ("'256 Patent"), titled "Embedded Wire Planar Write Head System and Method," issued to Biskeborn, Doscher, and Eaton, U.S. Pat. No. 7,322,096 ("'096 Patent"), which is a divisional of the '256 Patent, also titled "Embedded Wire Planar Write Head System and Method," and issued to Biskeborn, Doscher, and Eaton, and U.S. Pat. No. 7,119,976 ("'976 Patent"), titled "Planar Servo Format Verifier Head," issued to Biskeborn, Kirschenbaum, and Taylor. A characteristic of these prior art heads is beginning fabrication of the head with a trenched substrate, the trench being made into a nonmagnetic substrate, and the fabrication of the head proceeding thereupon with thin film processing. The trenched substrate is subsequently filled in so that the final plane of the recording head is substantially close to the plane of the originating substrate with the trench being filled in with much of the head structure.

FIGS. 1A and 1B illustrate a prior art magnetic write head of the type disclosed in the '256 Patent. The '256 Patent discloses building a head from a substrate 406 into which a trench has been made. For the single gap set head 400, the head is fabricated by depositing thin film layers into the trench. For each set of gaps 500, made up of arrays of discrete gaps 411 and 413 spanning the width of the tape, there is a single coil layer 410 running beneath the set of gaps 500. The coil layer 410 spans from one edge of the head to the other, parallel to the tape bearing surface, but the longitudinal axis and current flow of the coil layer 410 is perpendicular to the tape's velocity direction.

In FIGS. 2A and 2B, the '256 Patent further illustrates tandem head structures 900 and 1200 made from two pockets patterned into the insulating layer in a single trench 906. This embodiment has two coils, one for each pocketed head element 902, 904 (FIG. 2A) or 1202, 1204 (FIG. 2B). This embodiment allows for two head elements 902, 904 (FIG. 2A) or 1202, 1204 (FIG. 2B), each of which are functionally identical to single head element 400 but which are displaced in the down-track direction with respect to each other. Each of the two coil layers, i.e., 1208, 1210, drives a uniquely associated set of gaps, i.e., write gaps 1206 of first head element 1202 and write gaps 1206 of second head element 1204, respectively, that are staggered from one another in the down-track direction to accommodate the necessary conducting circuit 1208, 1210 that spans from one end of the slider to the other, beneath the associated gap set.

In FIG. 2C, the '256 Patent illustrates another embodiment 1000 based on a further down-track staggered gap and down-track staggered coil expansion of embodiment 900. In this embodiment 1000, a generalization of embodiment 900 is called out so that more gaps 1004 can be driven independently. In all of the above embodiments, the gaps are shown to be driven by a coil layer that spans from one edge of the slider to the other, each coil driving an associated set of gaps and each coil starting on one end of the slider body and ending on the other end. In the generalized embodiment, the gaps 1004 are aligned in a staggered formation to accommodate the necessary conducting circuits, and magnetic circuit, one circuit for each gap or gap set, and hence the gaps can only be written independently if they are staggered to accommodate the associated magnetic circuit and associated electrical conducting circuit.

The '096 Patent further discloses and teaches the same subject matter as the above described planar head built from a trenched substrate. The '976 Patent discloses a second trench for accommodation of the lead for a servo read head element and a formatting system for using such a head. This prior art embodiment is illustrated in FIG. 3.

The prior art only teaches planar heads built from a trenched substrate. Trenched substrate based heads lead to a natural result of air skiving edged, flat contour sliders that are velocity independent. However, the limited multichannel embodiments of the prior art have fabrication limitations and interconnect issues that are not fully addressed. In the independently written multi-channel embodiments, each channel is a full width trench head that is merely displaced in the down-track direction from one another. As such, seventeen such channels, for example, would require seventeen trenched heads displaced sixteen times in the down-track direction from one another. The resulting head-to-media interface would have an extremely wide media scrub zone that would mitigate the elegance of the air skiving single trench head.

Thus, there exists a need in the art for an easily manufactured planar magnetic head, particularly for tape servo format writing and verification, and more particularly for multi-channel embodiments with a narrow scrub path single bump interface. There is a need in the art for a method of making a planar magnetic head using a built-up approach on planar substrate, as opposed to deposition and lithography in a trenched substrate, to achieve a true planar head. There is a further need in the art for a method of making a planar magnetic head using thru-hole via technology to connect the leads to a conductive coil layer. There is a further need in the art for an easily manufactured planar magnetic head having independent channels without each gap set having to be displaced or staggered in the down-track direction.

BRIEF SUMMARY OF THE INVENTION

The present disclosure, in one embodiment, relates to a magnetic head for magnetic tape. The magnetic head may include a substrate having a substantially continuous surface generally parallel with a tape bearing surface of the magnetic head. A first magnetic layer may be deposited on the substantially continuous surface of the substrate. An electrically conductive coil layer is deposited on the first magnetic layer. A second magnetic layer may be deposited on the electrically conductive coil layer. The second magnetic layer may include one or more magnetic gap patterns. In further embodiments, the first and second magnetic layers may be separated from the electrically conductive coil layer by insulating layers. Additionally, the first and second magnetic layers may be connected through vias in the insulating layers to form a closed magnetic flux path.

The present disclosure, in another embodiment, relates to a method of making a magnetic head. The method may include providing a substrate having a substantially continuous surface generally parallel with a tape bearing surface of the magnetic head, providing a first magnetic layer on the substantially continuous surface of the substrate, providing an electrically conductive coil layer on the first magnetic layer, and providing a second magnetic layer on the electrically conductive coil layer. In other embodiments, a full single turn may be used or multiple turns may be used. The second magnetic layer may include one or more magnetic gap patterns. Electrically conductive vias may be provided that extend through the substrate and contact the conductive coil layer. In other embodiments, the leads may be brought to the edge of the slider body. In further embodiments, a first insulation layer may be provided between the first magnetic layer and the electrically conductive coil layer, and a second insulation layer may be provided between the electrically conductive coil layer and the second magnetic layer. Vias, connecting the first and second magnetic layers, may further be provided in the insulating layers to form a closed magnetic flux path.

The present disclosure, in a further embodiment, relates to magnetic media and/or formatted magnetic tape cartridges, which contain a media format particular to a planar magnetic head in accordance with the present disclosure, and particularly to a planar magnetic head having independent addressable channels. The present disclosure further relates to a method of formatting and or verifying magnetic media and/or magnetic tape cartridges using a write/read magnetic head in accordance with the present disclosure.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the present invention, it is believed that the invention will be better understood from the following description taken in conjunction with the accompanying Figures, in which:

DETAILED DESCRIPTION

The present disclosure relates to novel and advantageous magnetic recording heads and methods of making the same. Particularly, the present disclosure relates to novel and advantageous planar magnetic heads and methods of making planar magnetic heads using a built-up approach to achieve a true planar head. Furthermore, the present disclosure, in one of its embodiments, relates to a novel and advantageous method of making a planar magnetic head using thru-hole via technology to connect the leads to a conductive coil layer. In one embodiment, a magnetic head may comprise a substrate having conductive thru-hole vias extending through the substrate, a first magnetic layer deposited and patterned on the substrate, a first insulation layer deposited and patterned on the first magnetic layer, a conductive coil layer deposited and patterned on the first insulation layer, a second insulation layer deposited and patterned on the conductive coil layer, vias patterned or etched into the insulation layers extending to the first magnetic layer, a second magnetic layer deposited in the vias, and a third magnetic layer deposited and patterned on the second insulation layer and second magnetic layer. The third magnetic layer may be connected to the first magnetic layer through the second magnetic layer deposited in the vias of the insulation layers.

In regards to descriptions of magnetic and nonmagnetic materials, terms such as "nonmagnetic materials" and "magnetically impermeable materials" are meant to mean materials with a substantially or very low magnetic permeability approaching that of free space, which is of unit permeability. As magnetic fields permeate free space and all materials with the exception of superconductors and perfect diamagnetic materials, the practical concept of using high permeability or magnetically soft materials for the active recording head elements is juxtaposed to the use of nonmagnetic or magnetically impermeable materials for other parts of the device and the meaning should be made clear from the discussion and context provided herein.

In the figures that follow, some may be considered wafer level illustrations and other may be considered row bar or device level illustrations. In regards to the process illustrations which are predominately wafer level illustrations, the figures may also reveal the row bar level or device level sections and borders, so as to provide clarity.

Figure 1A:
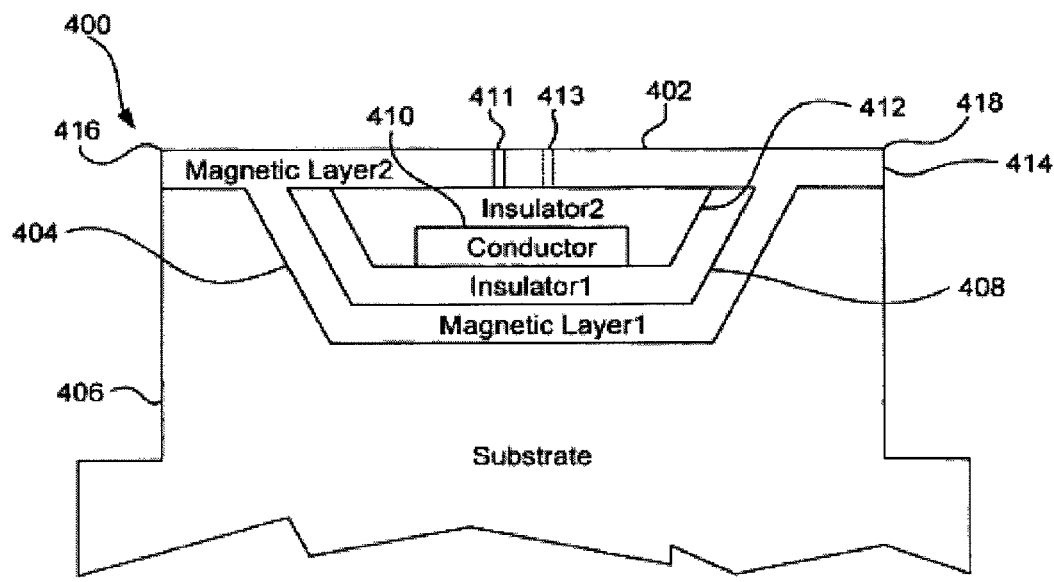
FIG. 1A is a cross-sectional view of a prior art magnetic head.
Figure 1B:
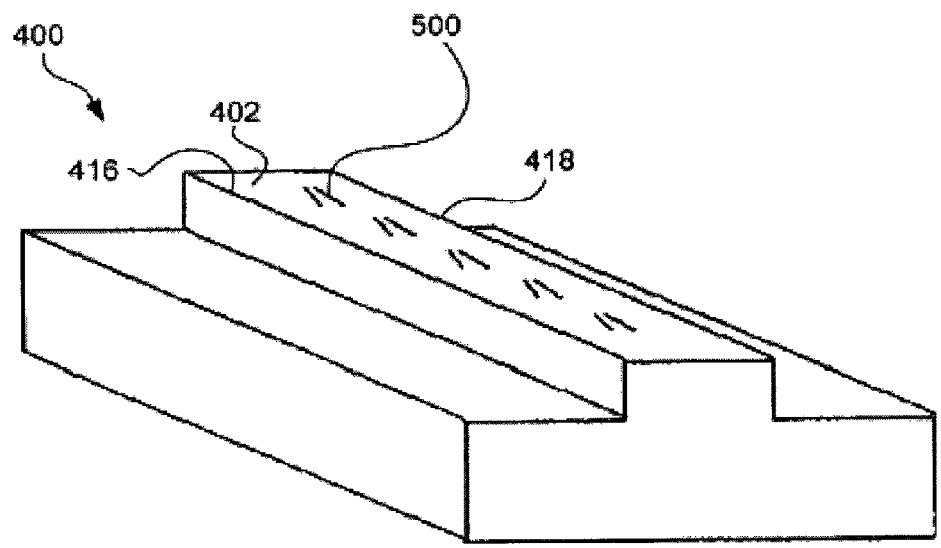
FIG. 1B is a perspective view of another prior art magnetic head.
Figure 2A:
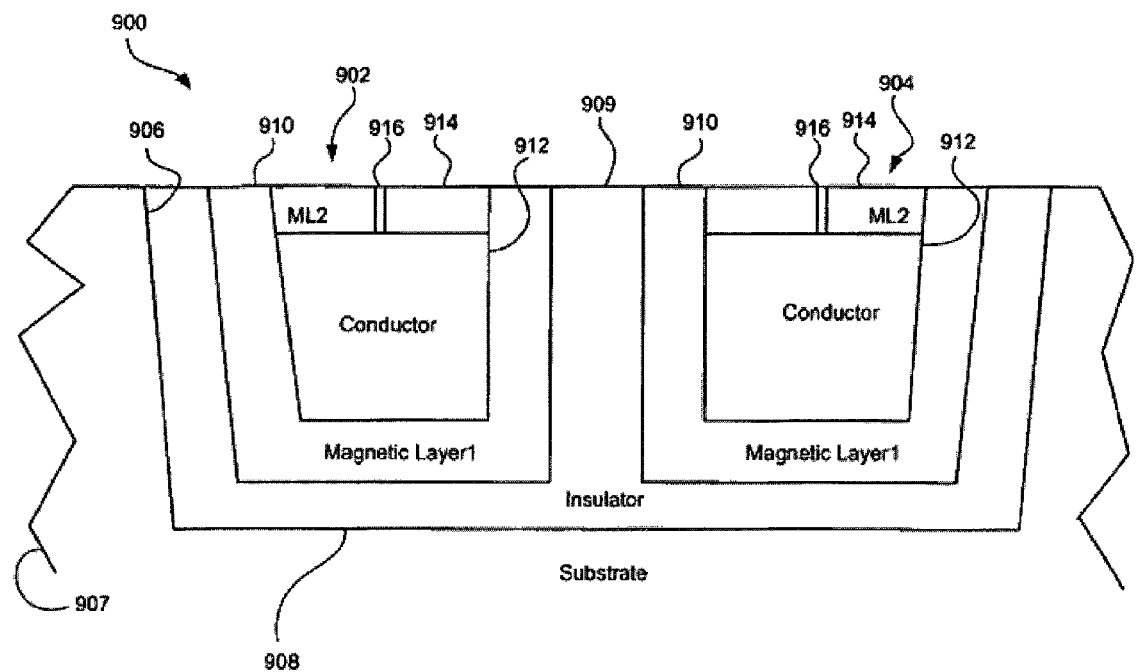
FIG. 2A is a cross-sectional view of a prior art magnetic write head with two staggered coil circuits and two staggered gap sets.
Figure 2B:
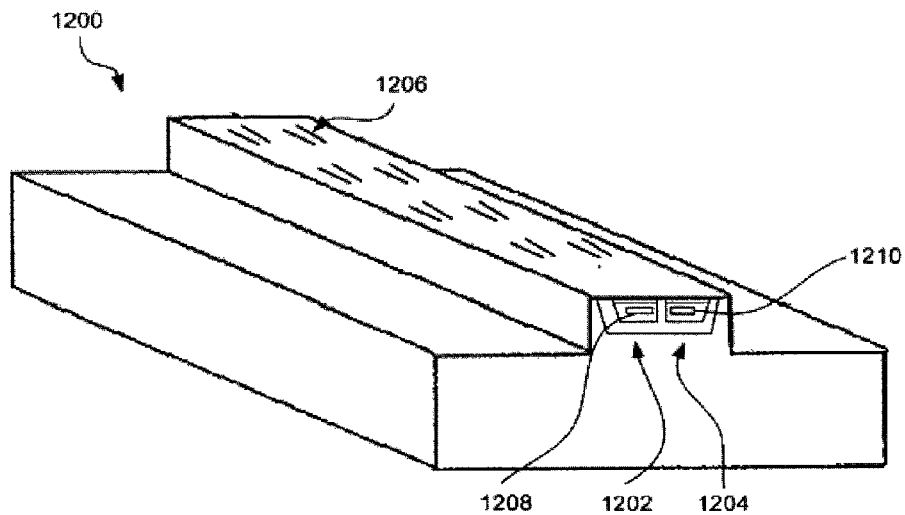
FIG. 2B is a perspective view of a prior art magnetic write head with two staggered coil circuits and two staggered gap sets, resulting in essentially two staggered heads made into a common trench.
Figure 2C:
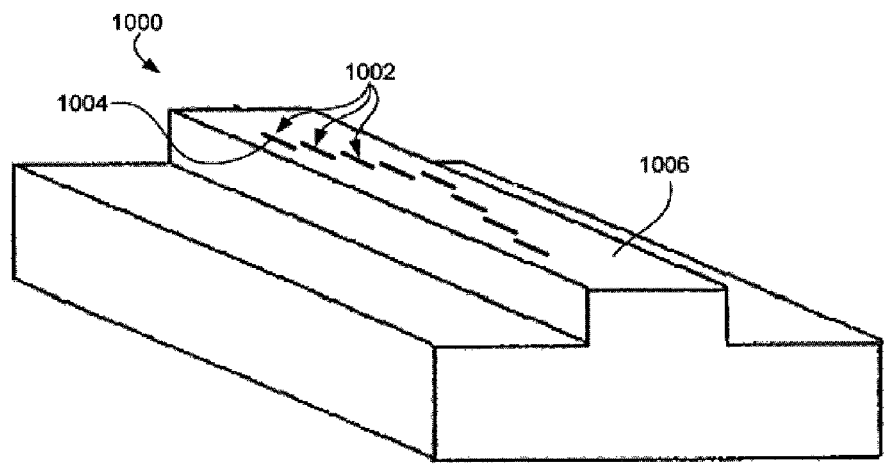
FIG. 2C is a perspective view of a prior art magnetic write head with an arbitrary array of staggered gaps and staggered coils, resulting in essentially a large number of staggered heads made into a common trench.
Figure 3:
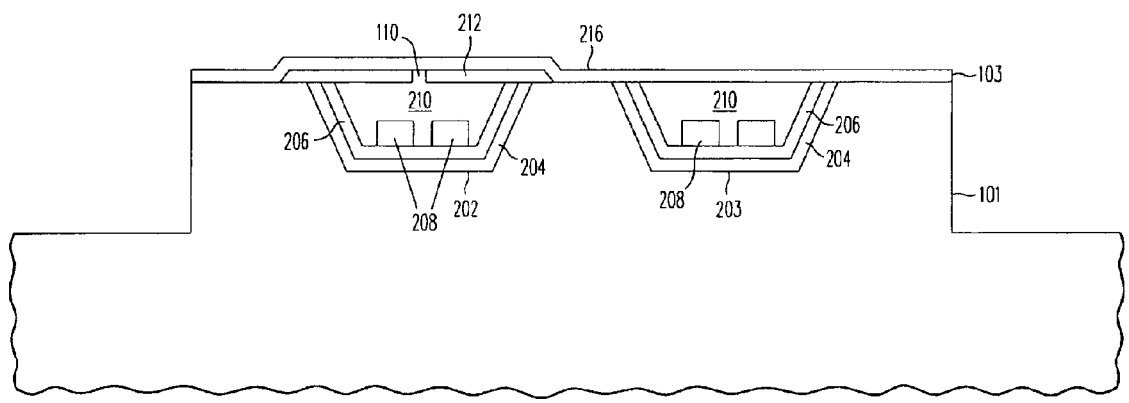
FIG. 3 is a cross section view of a prior magnetic read head.
Figure 4A:
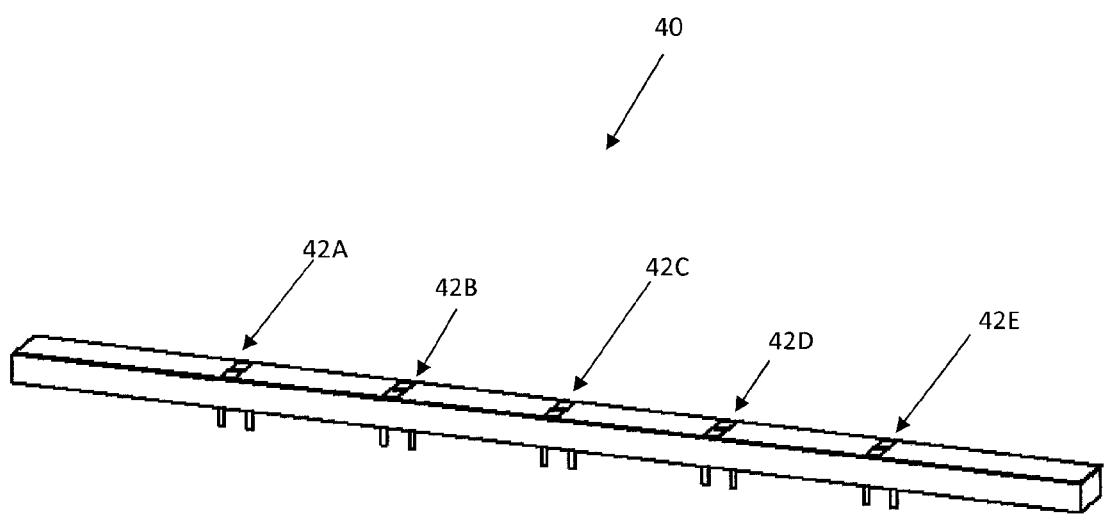
FIG. 4A is a perspective view of a multichannel magnetic head in accordance with an embodiment of the present disclosure.
Figure 4B:
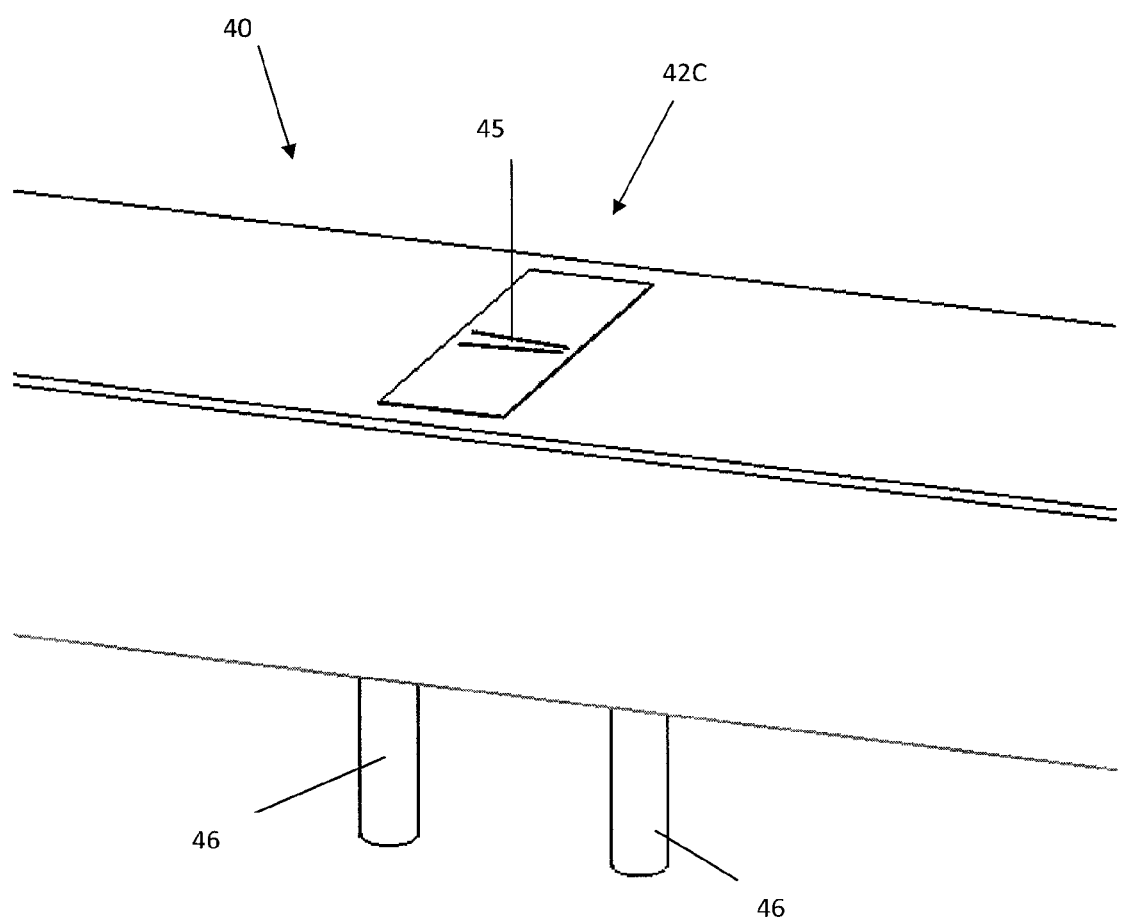
FIG. 4B is a close up perspective view of one of the head channels of the multichannel magnetic head shown in FIG. 4A.
Figure 4C:
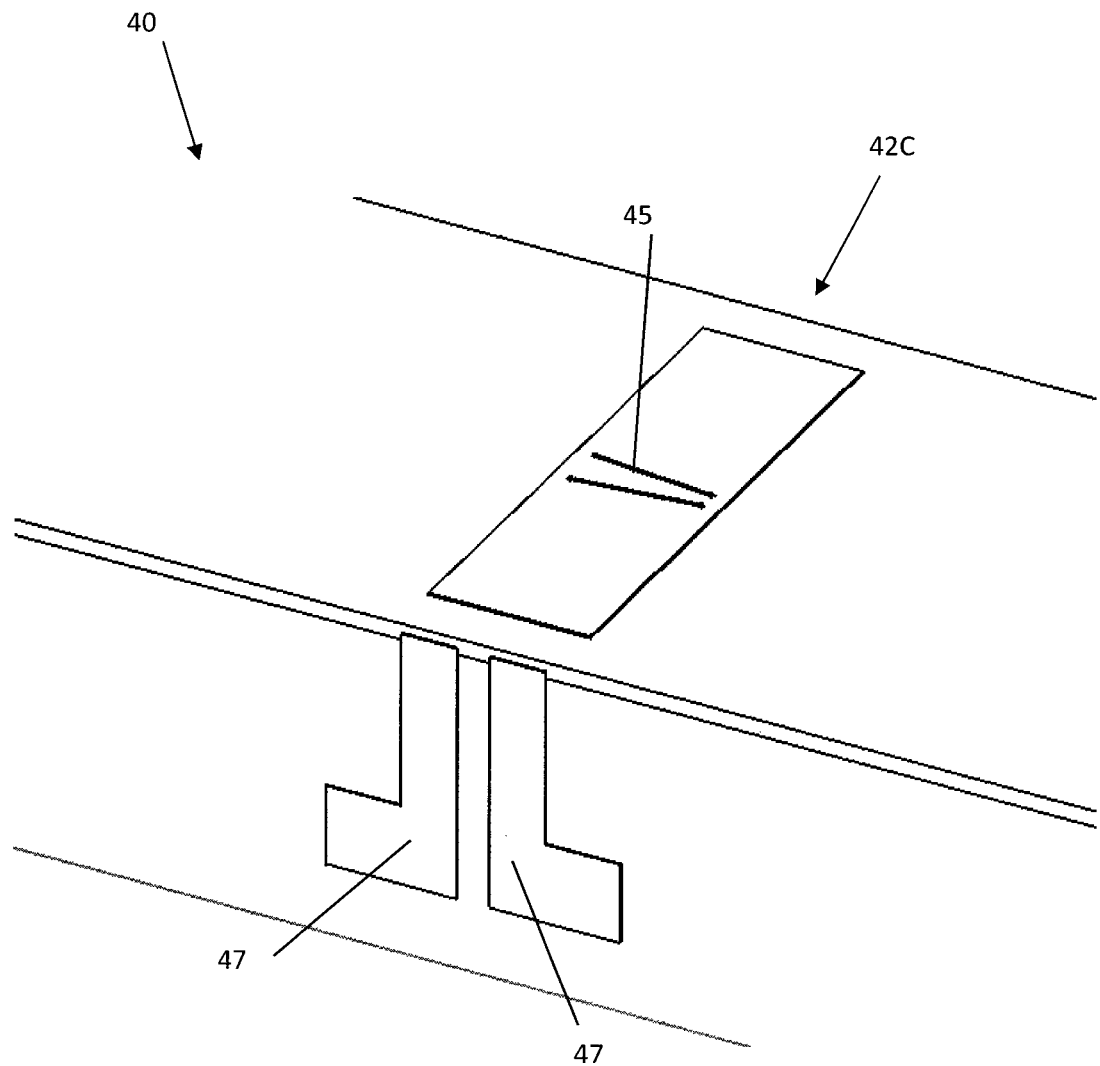
FIG. 4C is a close-up perspective view of one of the head channels of another embodiment of a multichannel magnetic head having a different lead configuration.

FIGS. 4A, 4B and 4C illustrate an embodiment of a multichannel magnetic head 40 in accordance with the present disclosure. In FIGS. 4A, 4B, and 4C, the head contour is flat and there is no slider body. In other embodiments, the head 40 may have a different contour, such as a curved, or cylindrical contour. FIG. 4A illustrates the completed head in a five-channel format with channels or bands 42A through 42E, and collectively and individually referred to as 42, with each of the five channels 42 having independent leads. While FIG. 4A illustrates five independently addressable channels 42A-42E, it is recognized that any suitable number of channels 42 may be employed, such as fewer or greater than five channels. Each of the channels may have the same or different signals impressed. The channels may be connected in series, parallel, or series-parallel in such common signal applications. Such signal may have a common phase or may be made to have a relative phase delay. Each of the independent channels 42 may have a gap configuration consisting of typically two gap lines. However, any combination of gap lines may be used, such as a single gap line or three or more gap lines per head channel. FIG. 4B illustrates a close up perspective view of a head channel, e.g., 42C, and the surrounding area, the head channel 42C having a pair of angled gaps 45. The external leads 46 illustrated in FIG. 4B are an electrical extension of the substrate thru-via leads, discussed in further detail below. These external leads 46, of FIGS. 4A and 4B, are shown for illustrative purposes only and can also represent solder or gold or alloy bumps that could form a direct bonded connection to a rigid lead assembly or flex circuit. Each of the channels 42 may be driven simultaneously or independently. Each of the channels 42 of magnetic recording head 40 may have individual coil layers with associated coil leads, as described in further detail below, such that each of the channels 42 may be driven independently with the same or different signals, as required for the format being written.

In another embodiment, as illustrated in FIG. 4C, the leads may be made to wrap around the edge of the head 40. In this embodiment, the side plane 49 of the head 40 may be lapped to reveal the planar surface coil and sputter or plate the edge leads 47 such that they make electrical connection to the edge revealed surface coil. The edge leads 47 may terminate in larger pad areas, as shown. The leads 47 may then be made to have contact with external circuitry by means of, for example but not limited to, a flex circuit, wire bonds, or soldered solid wire. Each of the channels 42 may be driven simultaneously or independently. Each of the channels 42 of magnetic recording 40 may have individual coil layers with associated coil leads, as described in further detail below, such that each of the channels 42 may be driven independently with the same or different signals, as required for the format being written.

Figure 5:
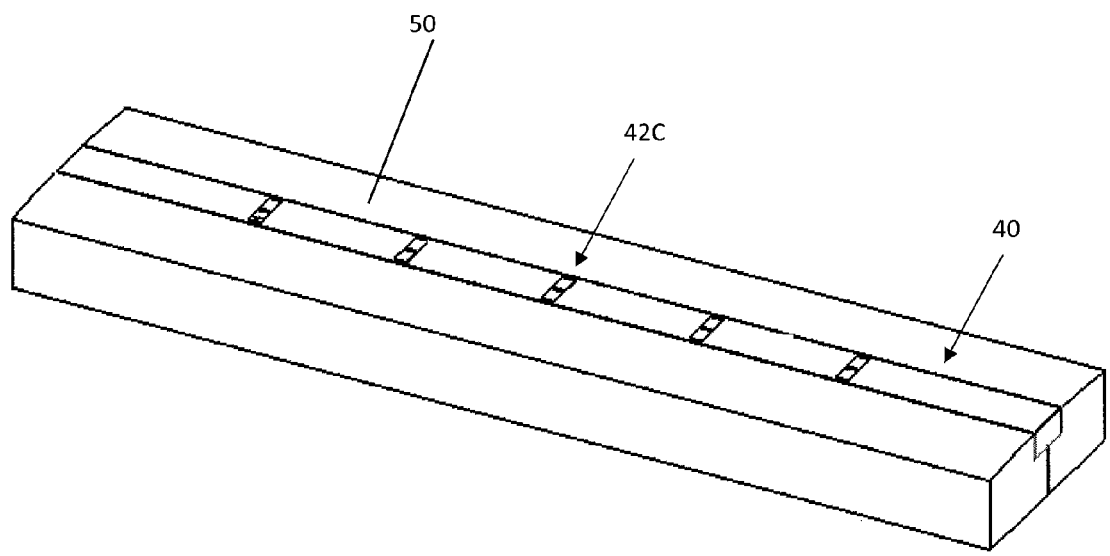
FIG. 5 is a perspective view of a multichannel magnetic head in accordance with an embodiment of the present disclosure that is placed into a slider body.

An embodiment of this head placed into an external slider body 50 is illustrated in FIG. 5. In alternative embodiments, the head 40 can comprise its own independent slider body, and an external slider body 50 may not be used. The external slider body 50 may be suitably made for a cylindrical contour head or a flat contour head. The external slider body 50 may have air bleed slots and/or skiving edges. The external slider body 50 may be made of a common hard ceramic, such as but not limited to bi-crystal poly crystal N58 AlTiC or polycrystal Al12O3, or may be made of single crystal sapphire, the latter allowing for transparency and direct optical observation of the head-to-tape interface. All of the above described slider systems are not limiting and other slider systems may be used without departing from the spirit and scope of the present disclosure.

Figure 6:
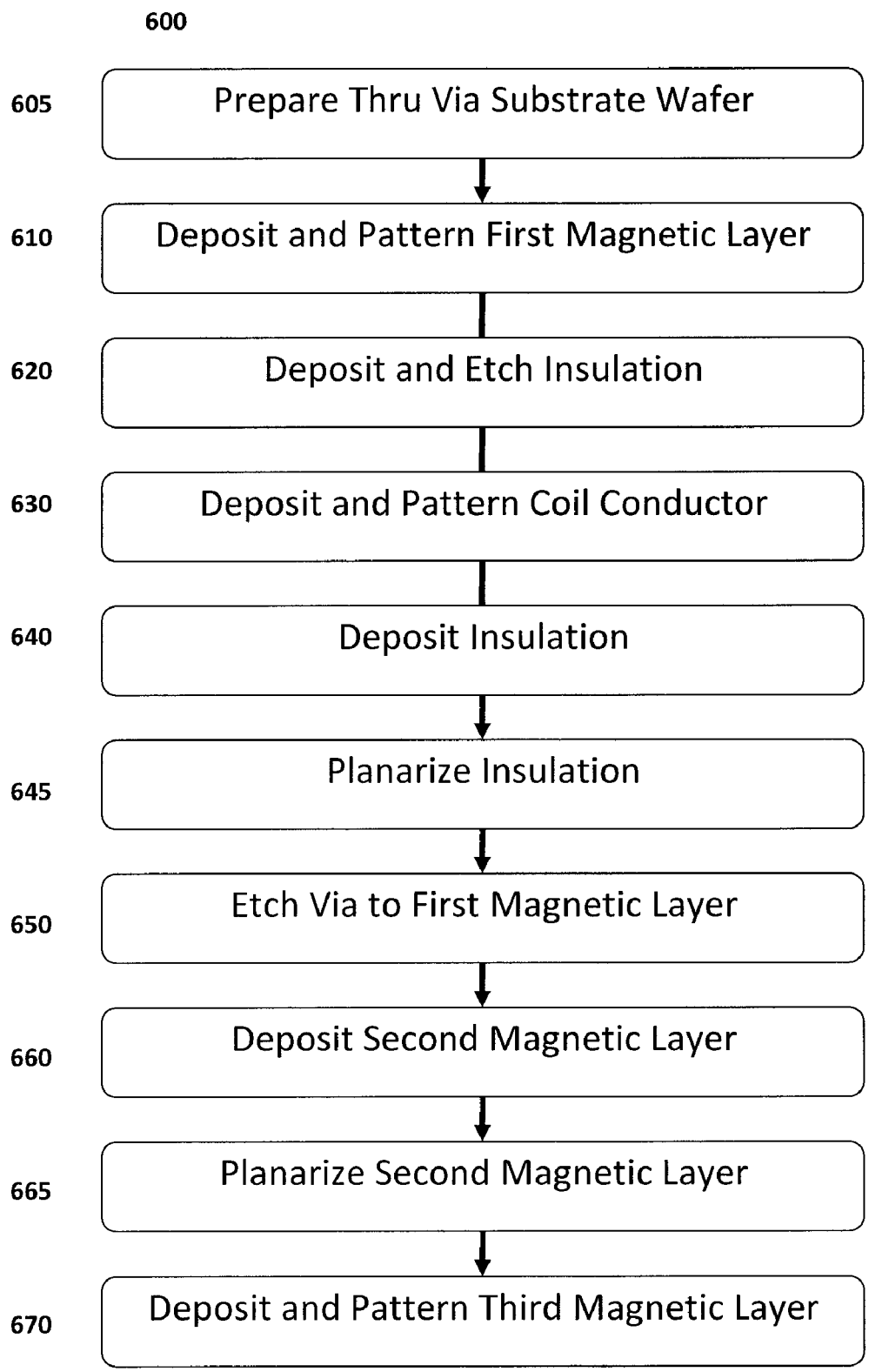
FIG. 6 is a flow chart of a method of making a magnetic head in accordance with one embodiment of the present disclosure.

FIG. 6 is a flow chart for a method 600 of making a magnetic head 40 according to one embodiment of the present disclosure. The steps illustrate a method of making a head 40 having a single strip line coil. However, a full coil turn or multiple coil turns are considered fully within the spirit and scope of the present disclosure; these embodiments may include more method steps and may result in a more efficient head. The method steps are not limiting and are not meant to be complete or exhaustive. In some embodiments, some of the steps may be excluded and other steps may be included without departing from the spirit and scope of the present disclosure.

Figure 7:
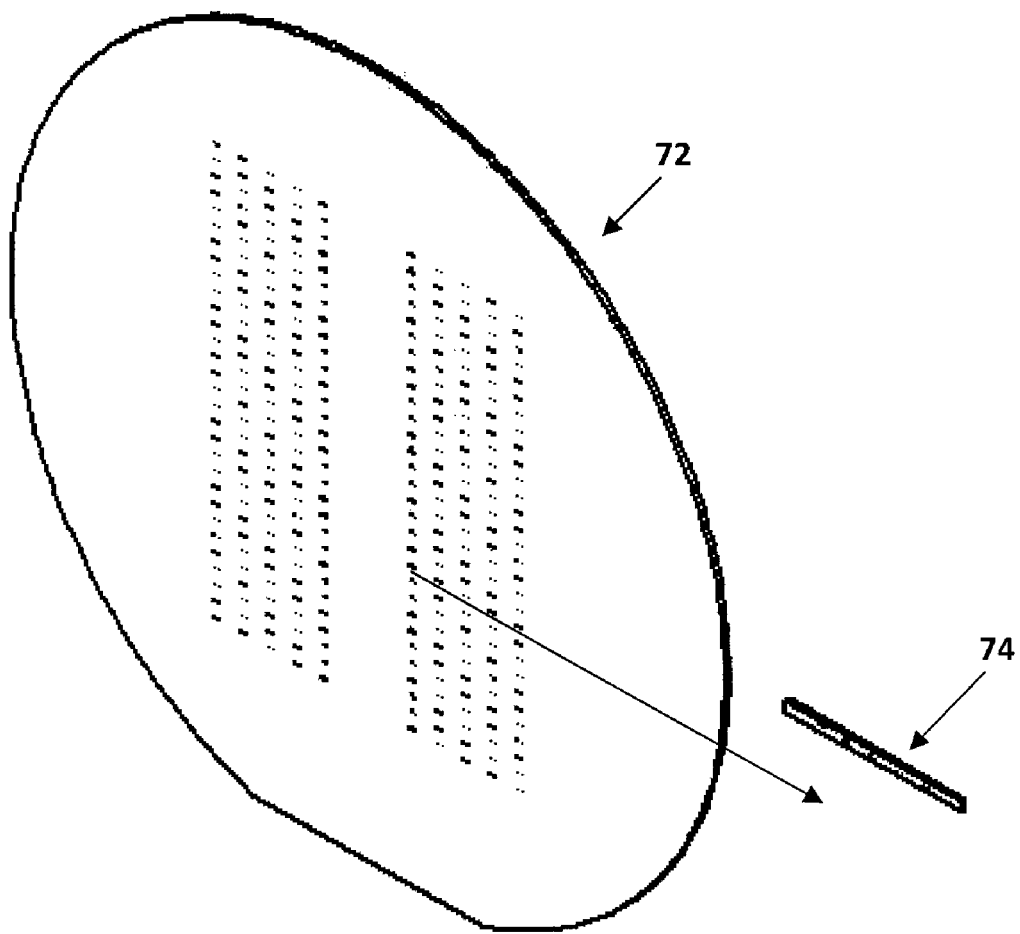
FIG. 7 is a perspective view of a substrate wafer in accordance with an embodiment of the present disclosure.

In step 605, and as illustrated in FIG. 7, a wafer level substrate 72 having a substantially continuous surface generally parallel with a tape bearing surface of the magnetic head 40 may be provided. Head row bar 74 is shown as a section of the wafer. The substrate 72 may be prepared having thru-hole vias 82 (shown in FIG. 8) for coil conducting leads. Alternatively, as discussed with reference to FIG. 4C, the leads may run to the edge of the head slider in the down-track direction and can be made to run over the edge of the slider and wrap around the corner by matching with leads running on the vertical face of the slider, and may subsequently be attached to flex or wire leads. Such an edge connection technique can offer an alternative to a thru-hole via technique. Alternatively, the leads may be run in the cross-track direction past the region of the tape bearing surface, and connect to pads so as to avoid interfering with the tape path, or they could wrap around these other perpendicular cross-track edges, as just discussed. Illustration of a substrate 72 wafer in FIG. 7 is not limiting, and a magnetic head 40 of the present disclosure may be manufactured at a wafer level or row bar level without departing from the spirit and scope of the present disclosure. In some embodiments, manufacturing at a wafer level may be preferred due to manufacturing efficiencies, and may further be preferred for flat head contours. In one embodiment, the wafer substrate 72 may comprise a silicon wafer, as the silicon wafer may easily have the vertical thru-hole vias prepared using the well known "Bosch" process, for example, and thus the process of making the vias can be a wafer level process. Another process for etching thru-hole vias is that of an anisotropic KOH wet etch. When using a semiconductor material such as silicon for the substrate, an initial non-conducting layer may be used to insulate the current leads so that the silicon does not electrically short the lead. Such insulating layers could be SiO2 or SiN, among other suitable materials. Similarly, insulating layers may be used so that the conductor-filled vias, described in detail below, will not be shorted by the semiconductor material.

Various techniques of connecting through the substrate may be considered fully within the scope of the disclosure. In regards to using KOH as a selective etch, if SiN is used as the first insulating layer of the planar device formation, this may also be used as an etch stop for KOH wet etching. In the latter embodiment, it is envisioned that the KOH thru-hole via etch could be used in a back-end process step.

In another embodiment, an insulating material may be used as the substrate. One such choice would be sapphire or other insulating technical ceramic, such as but not limited to zirconium oxide, alumina, calcium titanate, barium titanate, etc., each of which is commercially available in bulk or wafer form.

In yet another embodiment, the vias can be machined with high speed drilling techniques. This is a serial process and can be more expensive. However, with a non-conductive substrate, the subsequent oxidizing or insulating step is not required, mitigating the machining expense of a technical ceramic insulating substrate. Also, such materials are far harder than silicon and hence are mechanically more stable as a head slider body. Thus, a substrate, such as single crystal alumina, is entirely within the spirit and scope of the present disclosure and may offer many mechanical and electrical advantages.

Figure 8:
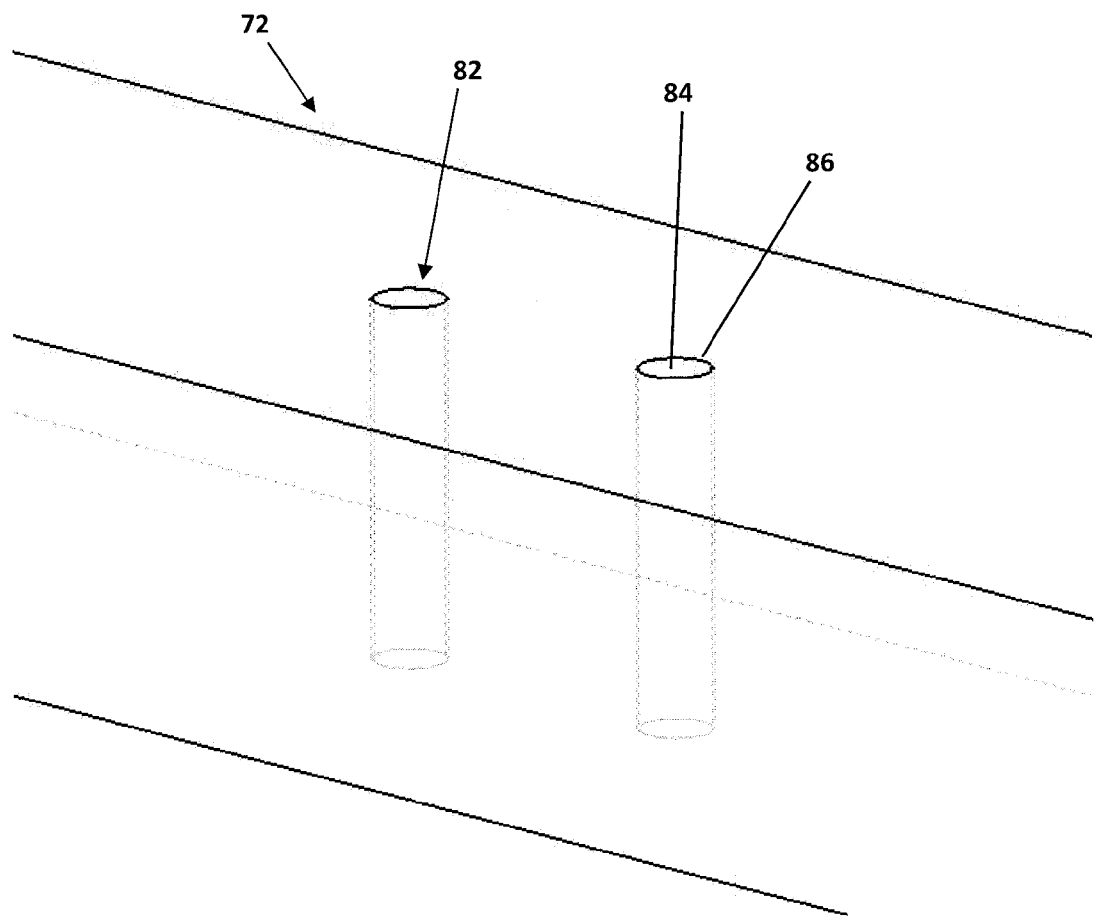
FIG. 8 is a perspective view of a single head channel of a multichannel head having thru-hole vias prepared in the substrate, the thru-hole vias having electrically conductive material deposited therein in accordance with an embodiment of the present disclosure.

As further shown in detail in FIG. 8, thru-hole vias 82 extend to the underside of the substrate 72. FIG. 8 may be considered a section of the wafer but can also represent a section of a head row bar. As stated above, a magnetic head 40 of the present disclosure may be manufactured at a wafer level or row bar level without departing from the spirit and scope of the present disclosure. A row bar may represent a single head row or may be multiple heads all in the same row. The length of the row bar cut from the wafer is a matter of choice or design in the manufacturing process. In one embodiment, there are two thru-hole vias 82 prepared in the substrate 72 for each channel. Other coil configurations, such as center tapped and magneto-resistive leads, may be considered and are within the spirit and scope of the present disclosure. Such coil configurations may require more leads per channel and therefore may involve more process steps. As illustrated in FIG. 8, an electrically conductive material 84 may be plated into, or otherwise placed into, the thru-hole vias 82, resulting in electrically conductive leads 86. In one embodiment, the electrically conductive material 84 may be copper. In other embodiments, the electrically conductive material 84 may be any other suitable electrically conductive material.

Figure 9:
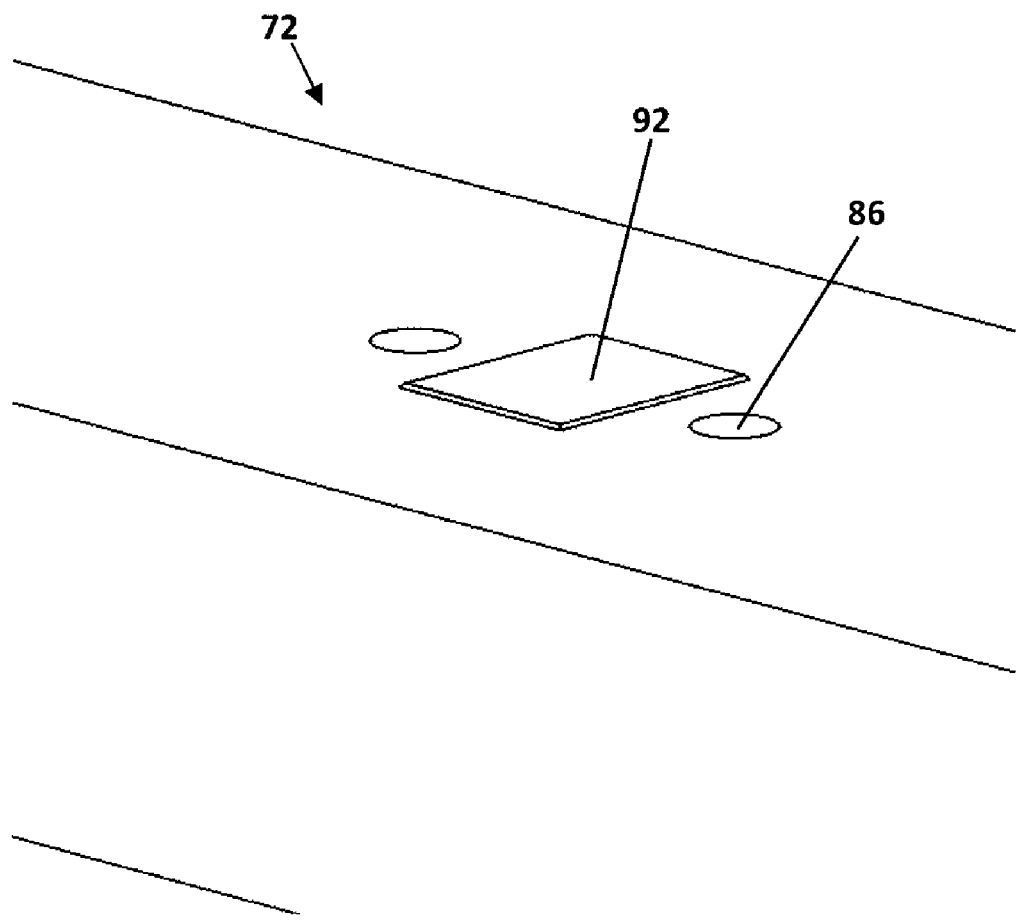
FIG. 9 is a perspective view of a single head channel of a multichannel head having a first magnetic layer deposited and patterned on top of the substrate in accordance with an embodiment of the present disclosure.

In step 610, and as illustrated in FIG. 9, a first, or bottom, magnetic layer 92 may be deposited and patterned on top of the substrate 72. The first magnetic layer 92 may comprise NiFe or other suitable magnetically permeable material or materials. In one embodiment, as shown in FIG. 9, the conductive leads 86 are entirely exposed and uncovered by the patterned first magnetic layer 92. The first magnetic layer 92 may be patterned according to a specific head design and/or requirement. The first magnetic layer 92 may comprise the bottom magnetic yoke of a magnetic circuit for the magnetic head 40.

Figure 10:
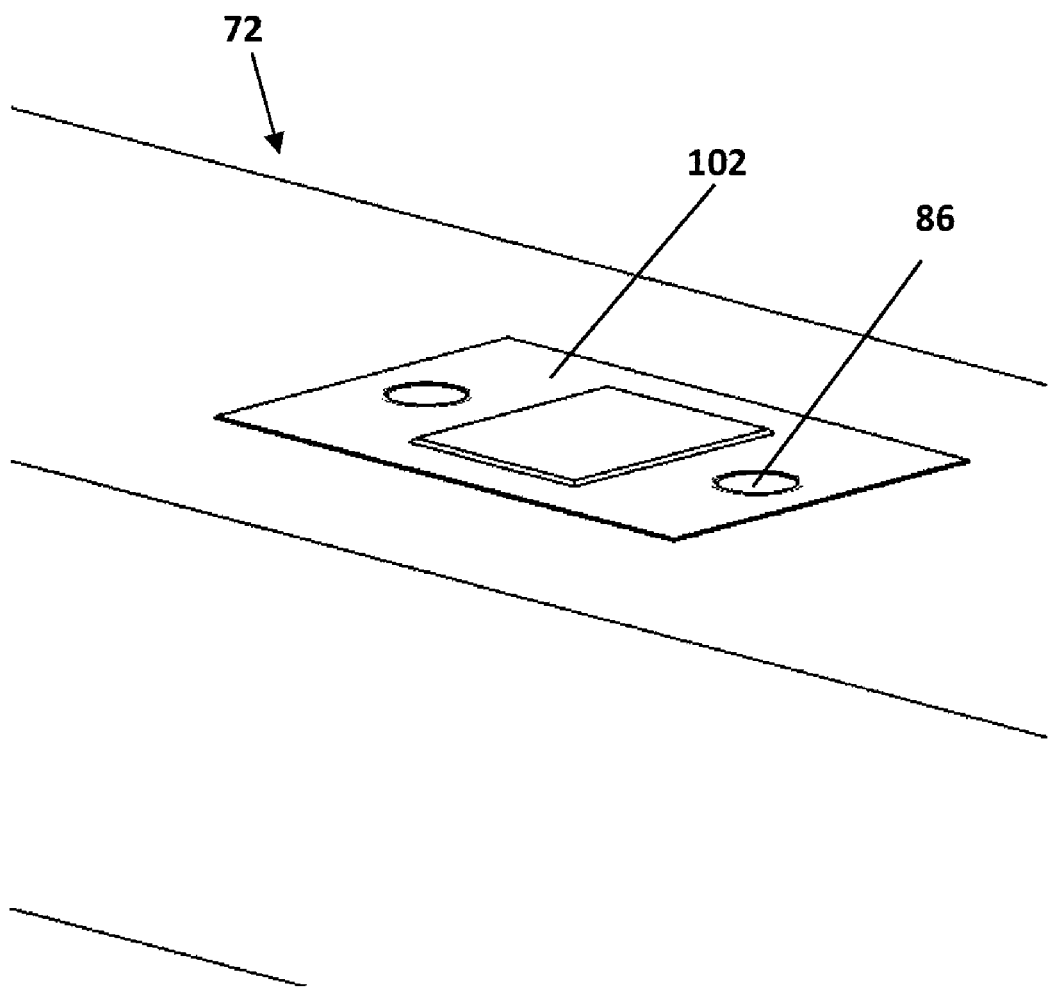
FIG. 10 is a perspective view of a single head channel of a multichannel head having a first insulation layer deposited and patterned on top of the first magnetic layer and substrate in accordance with an embodiment of the present disclosure.

In step 620, and as illustrated in FIG. 10, in one embodiment, a first insulation layer 102 may be deposited and patterned on top of the first magnetic layer 92 and substrate 72. In one embodiment, the first insulation layer 102 may comprise a nonmagnetic material. In one embodiment, as shown in FIG. 10, the conductive leads 86 may be entirely exposed and uncovered by the first insulation layer 102. The first insulation layer 102 may be patterned according to a specific head design and/or requirement. In a further embodiment, the first insulation layer 102 may be planarized. The first insulation layer 102 forms an insulating barrier for a subsequent coil layer. In alternative embodiments, a first insulation layer 102 may not be used, and the step of depositing and patterning the first insulation layer 102 may be eliminated. In such embodiments, the coil current will also run through the magnetic material.

Figure 11A:
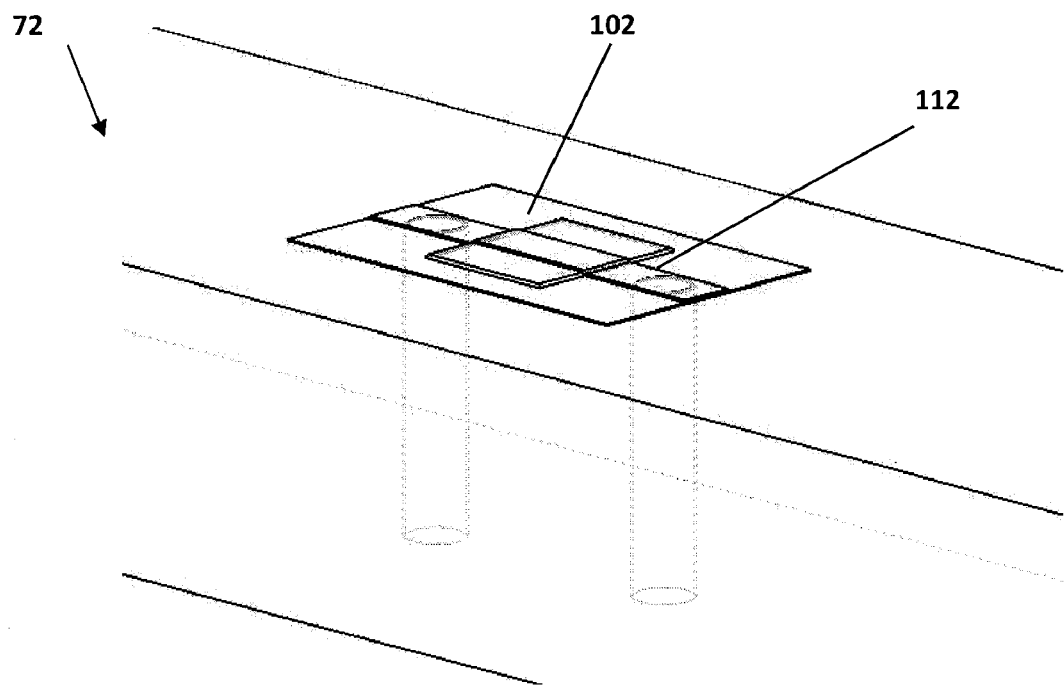
FIG. 11A is a perspective view of a single head channel of a multichannel head having a coil conductor layer deposited and patterned on top of the first insulation layer in accordance with an embodiment of the present disclosure.
Figure 11B:
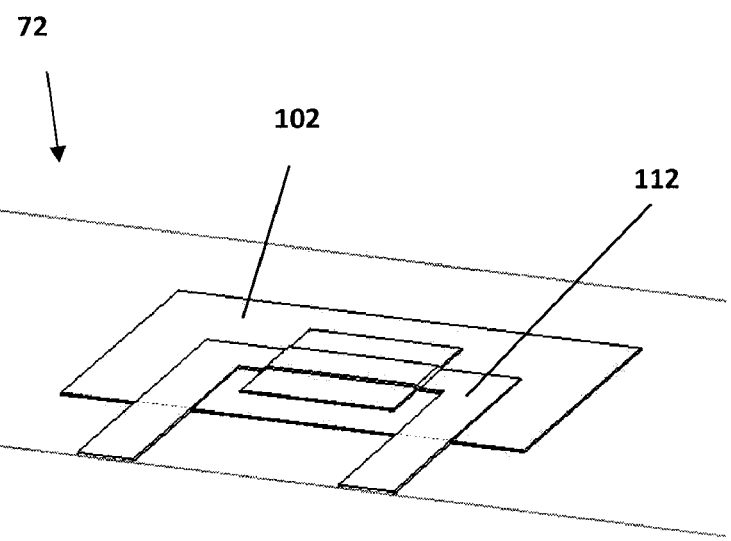
FIG. 11B is a perspective view of a single head channel of a multichannel head having a coil conductor layer deposited and patterned on top of the first insulation layer in accordance with another embodiment of the present disclosure.

In step 630, and as illustrated in FIG. 11A, a coil conductor layer 112 is deposited and patterned on top of the first insulation layer 102. The coil conductor layer 112, in one embodiment, may be copper. In other embodiments, the coil conductor layer 112 may be any other suitable electrically conductive material. The coil conductor layer 112 is patterned such that it extends over the first insulation layer 102, first magnetic layer 92, and substrate 72 from one conductive lead 86 to the other 86. FIG. 11B shows an embodiment wherein the coil layer 112 is directed to the edge of the row bar such that it may subsequently be revealed and connected to edge lead 47, as shown, for example, in FIG. 4C.

In alternative embodiments, the coil layer may be made into two layers with one layer going beneath the first magnetic layer 92 and then coming back on top of the first magnetic layer 92 to form a complete single-turn head. In such an embodiment, the thru-hole vias 82 may be prepared generally adjacent to each other. The resulting leads 86 would likewise be adjacent to one another. Such an alternative embodiment will allow for one layer below and one layer above the bottom magnetic yoke 92. Prior to depositing a first magnetic layer 92, a first conductor layer may be deposited and patterned or etched on the substrate 72. An insulator may then be deposited and etched over the first conductor layer. The head may then be planarized, and vias will be opened such that the second coil layer will connect with the bottom coil layer thru one via and then to the other lead end thru another via. Whether a single coil layer is used, or whether a full single-turn style coil, e.g., under and over the bottom magnetic yoke, is used will depend on the efficiency of the head and the write driver used. In the latter construction, the natural extension to a multi-turn helical coil is evident and would be particularly advantageous for an inductive read verify head or data head, each of which are within the spirit and scope of the present disclosure. Multi-turn helical coils can be done with no more layer processing than the full single-turn system described and would be particularly advantageous in a servo pattern verify inductive read head design.

Figure 12A:
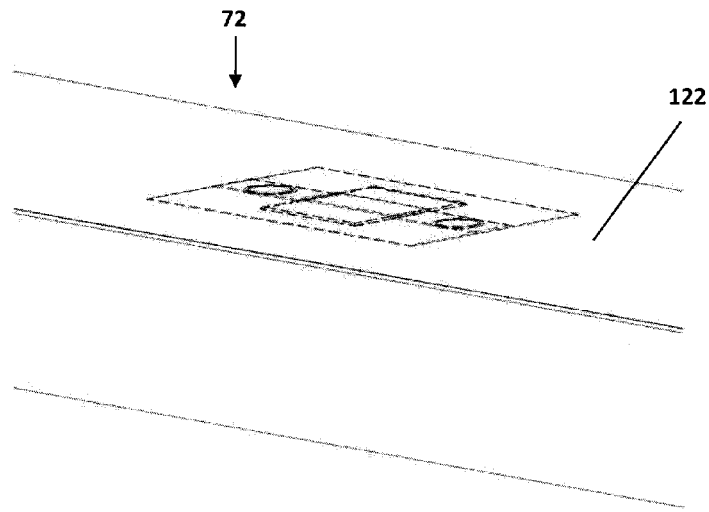
FIG. 12A is a perspective view of a single head channel of a multichannel head having a second insulation layer deposited over the coil conductor layer, first insulation layer, first magnetic layer, and substrate in accordance with an embodiment of the present disclosure.
Figure 12B:
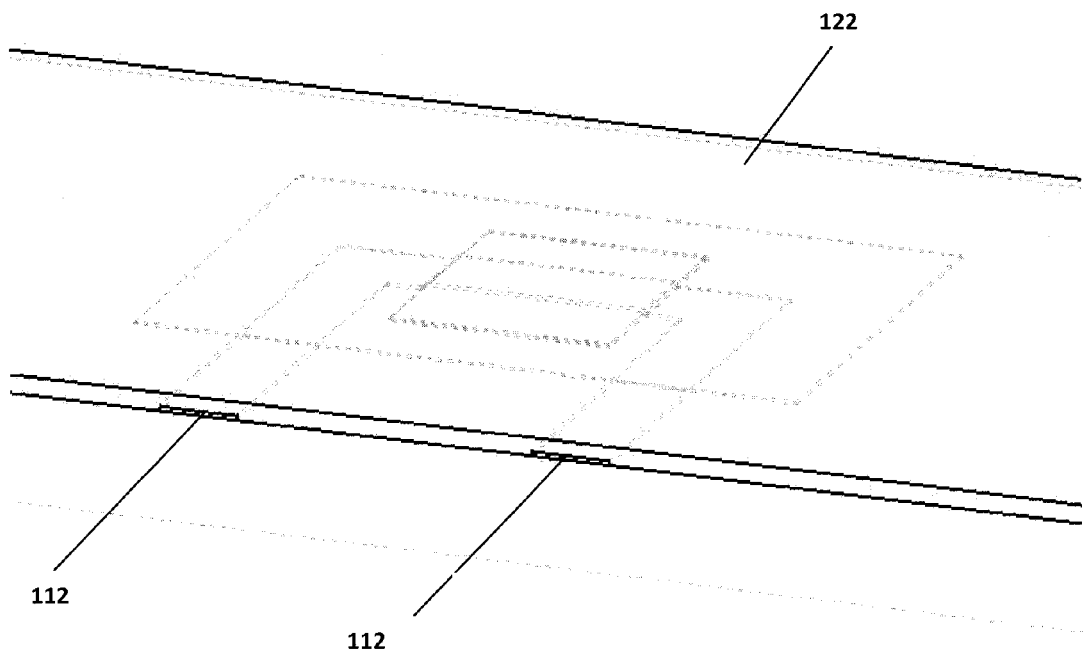
FIG. 12B is a perspective view of a single head channel of a multichannel head having a second insulation layer deposited over the coil conductor layer, first insulation layer, first magnetic layer, and substrate in accordance with another embodiment of the present disclosure.

In step 640, and as illustrated in FIG. 12A, a second insulation layer 122 may be deposited over the coil conductor layer 112, first insulation layer 102, first magnetic layer 92, and substrate 72. The insulation layer 122 may comprise a nonmagnetic material and may insulate the coil conductor 112 from a subsequent upper magnetic layer. In one embodiment, the second insulation layer 122 may be deposited across the entire surface of the substrate 72, e.g., the entire surface of the substrate wafer. In a further embodiment, in step 645, the second insulation layer 122 may be planarized to eliminate height differential in the tape path and provide a planar layer of insulation on the substrate 72. The conductive leads 86, coil conductor layer 112, first insulation layer 102, and first magnetic layer 92 are illustrated in dashed line in FIG. 12A, indicating the location of each beneath the second insulation layer 122. In alternative embodiments, a second insulation layer 122 may not be used, and the step of depositing and patterning the second insulation layer 122 may be eliminated. In some embodiments, both the first insulation layer 102 and the second insulation layer 122 may not be used. In such embodiments, there may be no insulating layers between the coil conductor layer 102 and the magnetic layers. However, in many practical situations with current thin film materials, it will be preferred to use insulating layers, as most magnetic materials are conductors and having write currents inside the magnetic layers may not lead to a well-behaved head. The situation may become even more complicated if the recording medium is a conductive thin film. As illustrated in another embodiment in FIG. 12B, the coil leads may be made to terminate along the row bar boundary such that they may be exposed and connected to edge leads 47, as shown, for example, in FIG. 4C.

Figure 13:
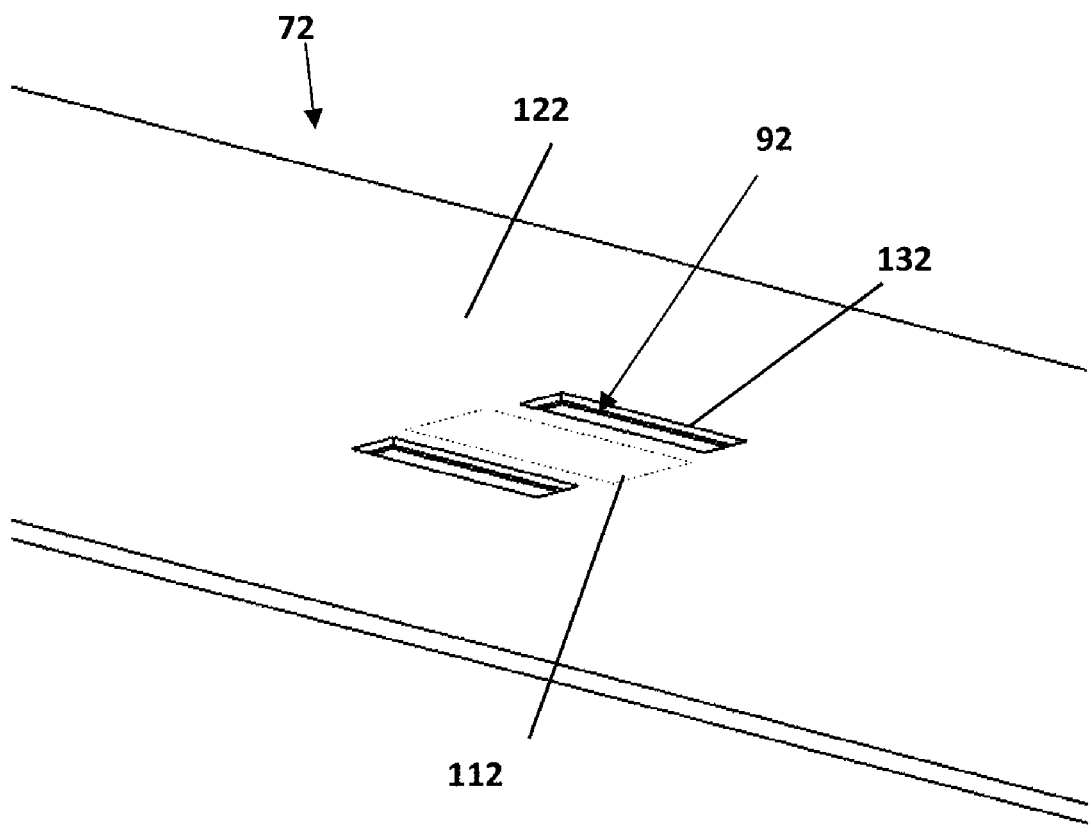
FIG. 13 is a perspective view of a single head channel of a multichannel head having vias provided in the second insulation layer.

In step 650, and as illustrated in FIG. 13, a via 132 may be etched, or otherwise prepared, in the surface of the second insulation layer 122. The via 132 may extend through the second insulation layer 122 and first insulation layer 102 to the first magnetic layer 92. As can be seen in FIG. 13, vias 132 may be provided on each side of the coil conductor layer 112 and expose at least a portion of the first magnetic layer 92.

Figure 14:
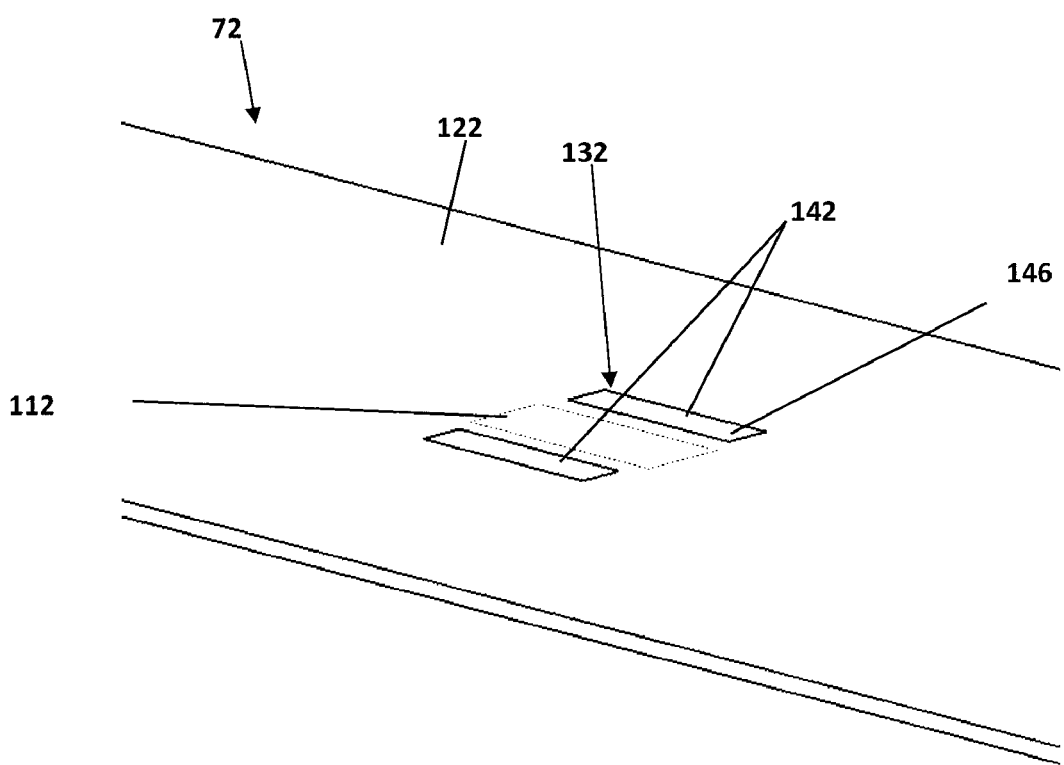
FIG. 14 is a perspective view of a single head channel of a multichannel head having a second magnetic layer deposited in the vias and creating magnetic subpoles to form a closed magnetic path in accordance with an embodiment of the present disclosure.

In step 660, and as illustrated in FIG. 14, a second magnetic layer 142 may be deposited on top of the second insulation layer 122, and into the vias 132, thereby filling vias 132 down to the level of the first magnetic layer and creating magnetic subpoles 146 in the vias. The magnetic sub-poles 146 are made from the planarized blanket film 142. The second magnetic layer 142 may comprise NiFe or other suitable highly permeable magnetic material. In step 665, and as illustrated in FIG. 14, the second magnetic layer 142 may be planarized to remove extraneous magnetic material from the surface of the second insulation layer 122 and reveal the discrete subpoles 146 made of material 142. Planarization may be important, in some embodiments, to remove height differential in the tape path and provide a planar, wear-bearing surface without undue step height differentials. The magnetic subpoles 146, e.g., the remaining section or component of magnetic film 142 after planarization step 665, connect the first magnetic layer 92, or lower magnetic yoke, to an upper magnetic film, which carries the gap pattern(s). Alternatively, the magnetic sub-poles may be directly plated up into the vias.

Figure 15:
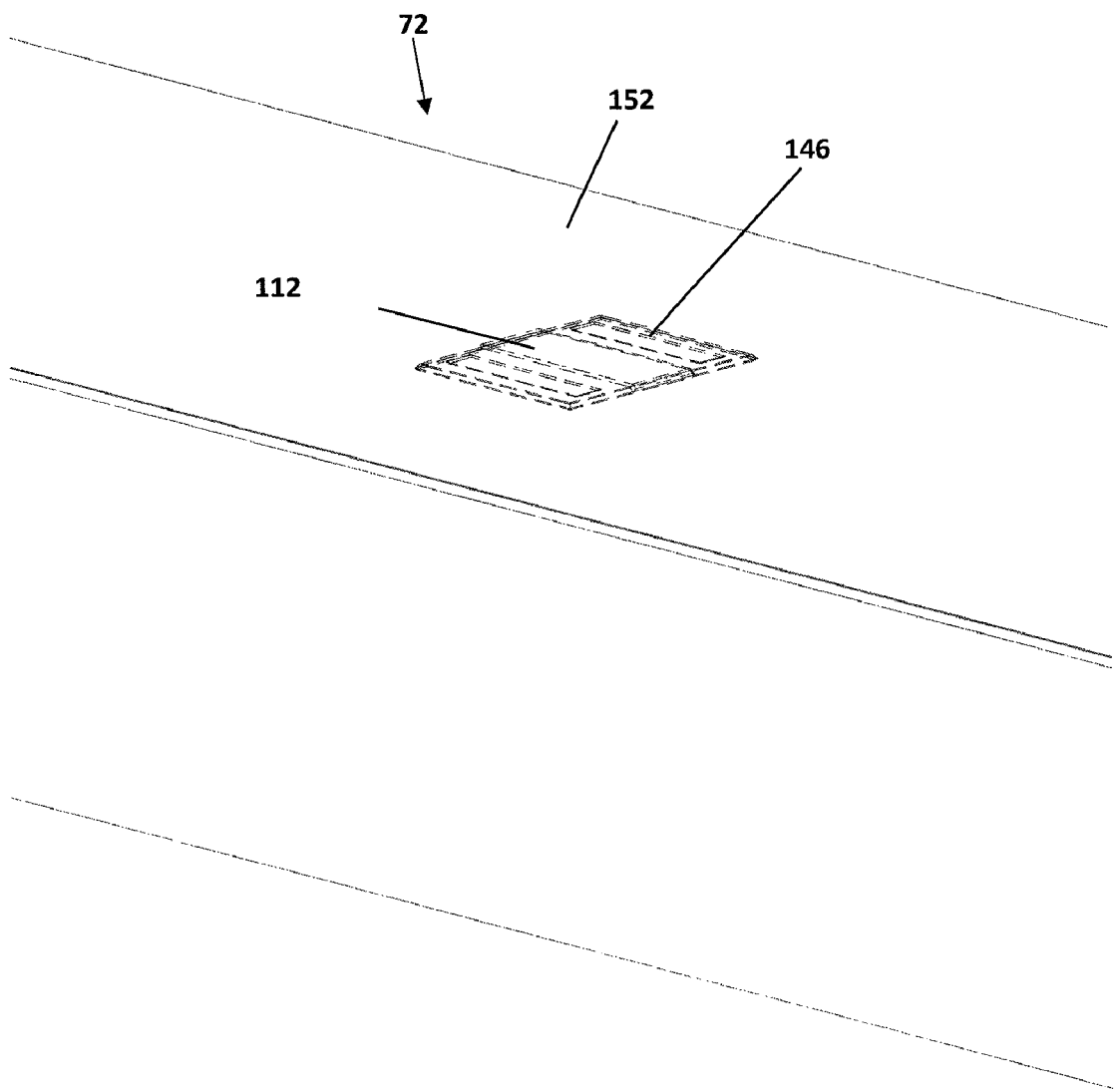
FIG. 15 is a perspective view of a single head channel of a multichannel head having a third magnetic layer deposited on top of the second magnetic layer and second insulation layer in accordance with an embodiment of the present disclosure.

In step 670, and as illustrated in FIG. 15, a third, or upper, magnetic layer 152 is deposited on top of the second magnetic layer 142 and second insulation layer 122, which have been co-planarized as shown in FIG. 14. Subpoles 146 are illustrated in dashed line in FIG. 15, indicating the location of the subpoles 146 beneath the third magnetic layer 152. The third magnetic layer 152 may comprise NiFe or other suitable magnetically permeable material.

Figure 16A:
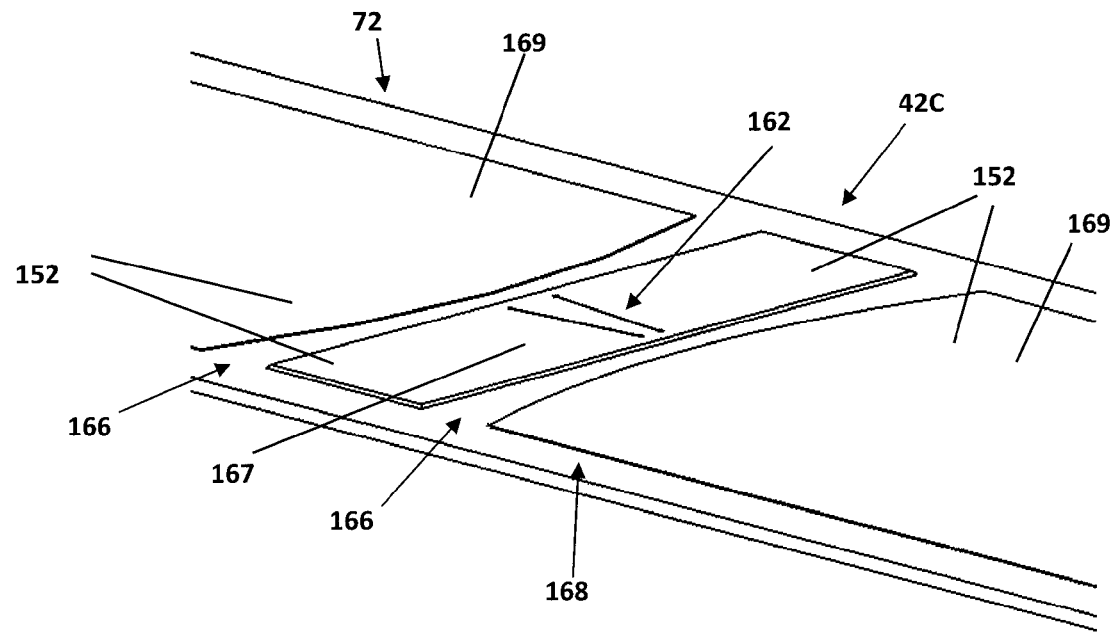
FIG. 16A is a perspective view of a single head channel of a multichannel head having a gap pattern formed in the third magnetic layer, wherein the third magnetic layer is further patterned to provide magnetic isolation from channel to channel in accordance with an embodiment of the present disclosure.
Figure 16B:
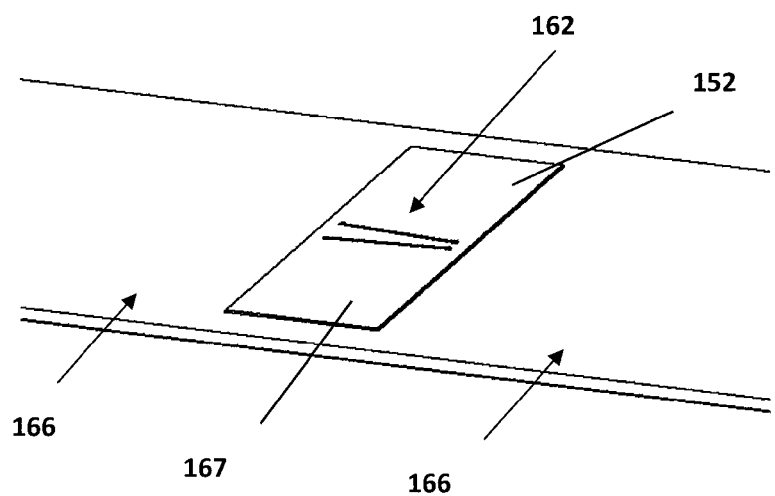
FIG. 16B is a perspective view of a single head channel of a multichannel head having a gap pattern formed in the third magnetic layer, wherein the third magnetic layer is further patterned to provide magnetic isolation from channel to channel in accordance with another embodiment of the present disclosure.

As illustrated in FIG. 16A, a gap pattern 162 is etched, or otherwise prepared, into the third magnetic layer 152 for the magnetic head channel 42C. In other embodiments, the third magnetic layer 152 can be plated up and around gap features made in photoresist to form the gap pattern 162, or the gap pattern 162 may be made into photoresist and then deposited over in a lift-off process. The gap pattern 162 made into film layer 152 may be any suitable timing-based or amplitude-based gap pattern or a data write or data read gap pattern. As further illustrated in the embodiment of FIG. 16A, the third magnetic layer 152 may further be patterned or etched to provide magnetic isolation spaces 166 in the magnetic layer 152, for example, from channel 42B to channel 42C of magnetic head 40. Likewise the edge of the film 168 can be placed on or backed away from the edge of the head row bar element 74. Such patterning of the gaps 162 and the isolation spaces 166, 168 could also have been prepared as part of step 670 or may be done as independent process steps, depending on the manufacturing methods chosen. Additionally, the third magnetic layer 152 can be patterned to define a well-behaved, flux bearing, head channel film element 167 and non-flux bearing magnetic elements 169 of the third magnetic layer 152. Such isolation and flux confinement produces a true multichannel magnetic head, while the flux bearing and non-flux bearing film elements provide a substantially coplanar tape bearing surface feature. In yet another embodiment, as illustrated in FIG. 16B, the non-magnetic flux bearing film 169 may be completely eliminated and etched away leaving only magnetic flux bearing film 167 of blanket deposited thin film 152. Alternatively the film 152 and/or film 167 and/or film 169 may be made by selectively plating up. Further discussion of non-magnetically energized wear pads may be found in U.S. Pat. No. 6,989,960, issued Jan. 24, 2006, titled "Wear Pads for Timing-Based Surface Film Servo Heads," which is hereby incorporated by reference herein in its entirety.

As illustrated in FIGS. 16A and 16B, the channel film element 167 may extend past the top and bottom of the gap pattern slightly, so that the pattern does not wear prematurely at the top and bottom. Likewise, the channel film element 167 may extend outside the subpoles 146 toward the edge of the slider body to provide a stable tape-bearing surface.

In other embodiments, vias 132 and the second magnetic layer 142 may not be used. In such embodiments, there may not be a magnetic connection between the first magnetic layer 92, or bottom magnetic yoke, and the third, or upper, magnetic layer 152. This may result in a less efficient head, but a cheaper and easier to build head.

Figure 17:
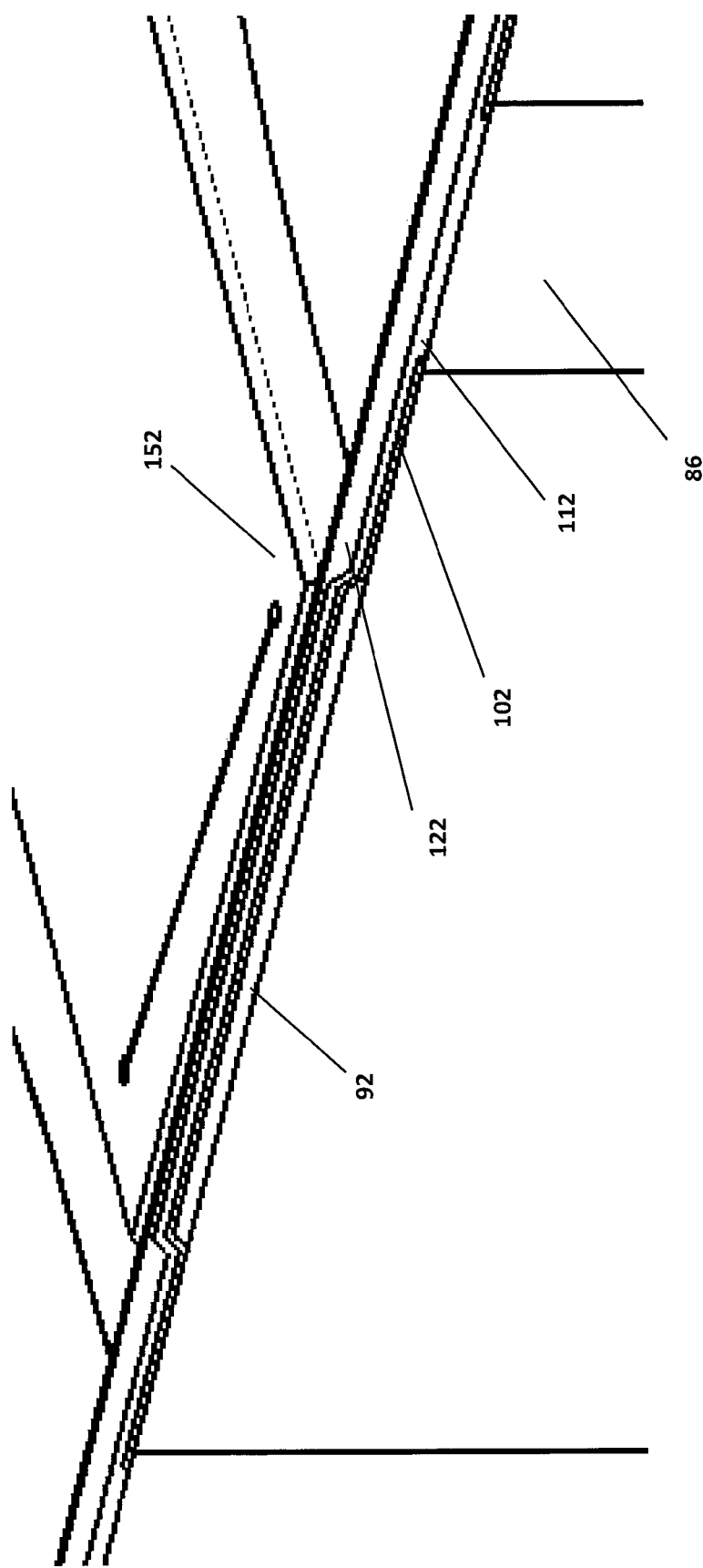
FIG. 17 is a detailed perspective cross-sectional view, in the cross-track direction, of a channel of a magnetic head in accordance with an embodiment of the present disclosure.

FIG. 17 illustrates a detailed cross-section, in the cross-track direction, of a channel 42C of a magnetic head 40 in accordance with one embodiment of the present disclosure. The cross-section features shown include the first magnetic layer 92, the first insulation layer 102, the coil conductor layer 112, the second insulation layer 122, and the third magnetic layer 152.

Figure 18:
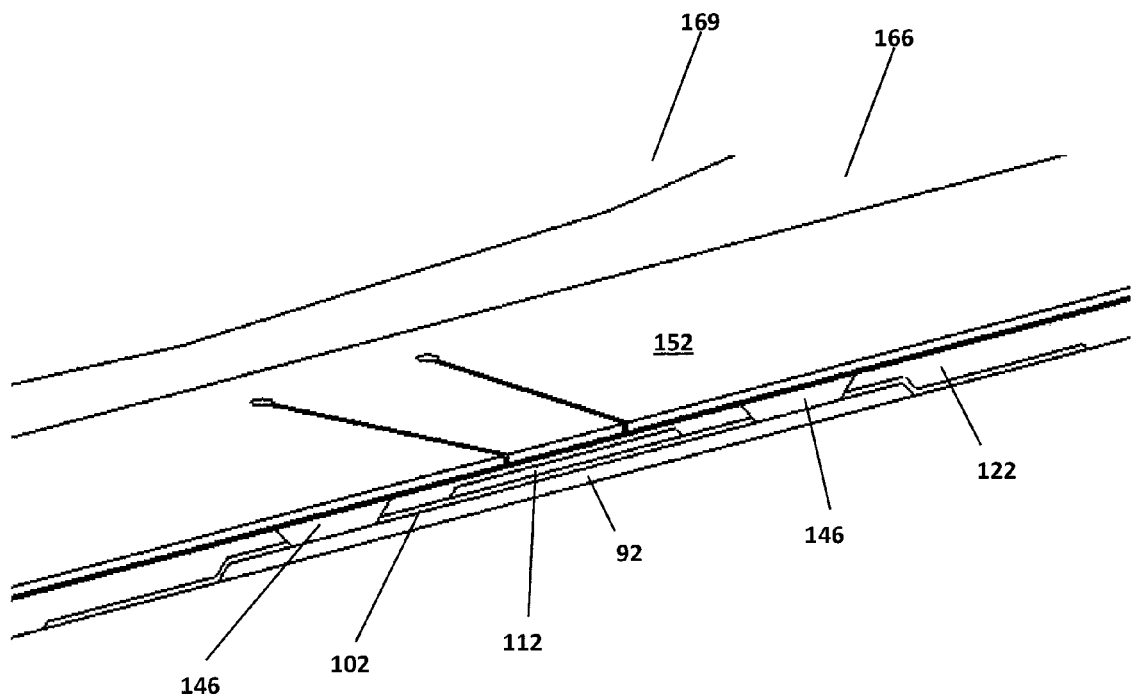
FIG. 18 is a detailed perspective cross-sectional view, in the down-track direction, of a channel of a magnetic head in accordance with one embodiment of the present disclosure.

FIG. 18 illustrates a detailed cross-section, in the down-track direction, of a channel 42C of a magnetic head 40 in accordance with one embodiment of the present disclosure. The cross-section features shown include the first magnetic layer 92, the first insulation layer 102, the coil conductor layer 112, the second insulation layer 122, the magnetic subpoles 146, and the third magnetic layer 152.

In both cross-sectional illustrations of FIGS. 17 and 18, the nature of the topology and the associated step heights are shown for purposes of illustration only. The exact material physical topology is a function of the specific process used, and in particular, which planarization operations were performed and in which order they were performed. One skilled in the art will understand that the exact final process, the exact step heights, and the topology will be a function of the exact processing operations and process order chosen and all are to be considered fully within the spirit and scope of the present disclosure.

In some embodiments, the magnetic head 40 may have a generally flat contour or surface or a non-flat contour or surface. Furthermore, the magnetic head 40 may include negative pressure features, such as but not limited to, skiving edges or air bleed slots. The magnetic head 40 may also include embedded tape edge guides, such as the guides disclosed in U.S. Prov. Appl. No. 61/022,872, filed Jan. 23, 2008, titled "Apparatus and Methods for Recording Heads with Embedded Tape Guides, Systems for Such Recording Heads, and Magnetic Media Made by Such Recording Heads," which is hereby incorporated by reference herein in its entirety.

In further embodiments, the underside of the substrate 72 may be "bumped" with conductors that connect the magnetic head 40 through its underside, for example, to a physical electrical connector to a write driver or read back amplifier. For example, in one embodiment, a masking layer or photoresist layer may be deposited and patterned or etched on the underside of the substrate 72. The masking layer may be patterned such that the electrically conductive leads 86 are at least partially exposed on the underside of the substrate 72. An electrically conductive material, such as but not limited to indium, gold, gold-tin eutectic, etc., may be deposited or bumped onto the exposed electrically conductive leads 86, thereby creating conductive bumps or posts on the underside of the substrate 72, such that the head element may be bonded to a lead element. Similar bumping may be done on the edge connector embodiment shown, for example, in FIG. 4C.

Figure 19A:
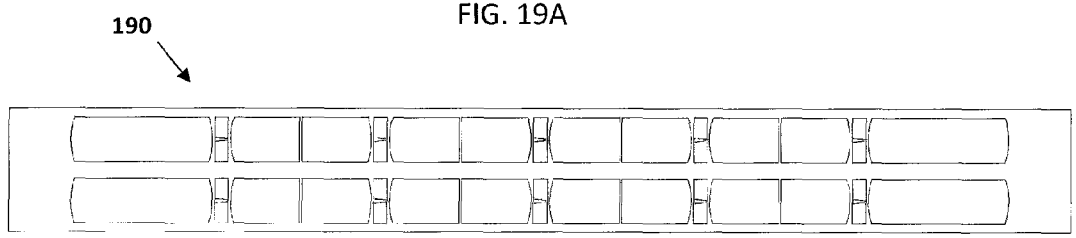
FIG. 19A is a top view of a magnetic head having a two-dimensional array of channels in accordance with an embodiment of the present disclosure.
Figure 19B:
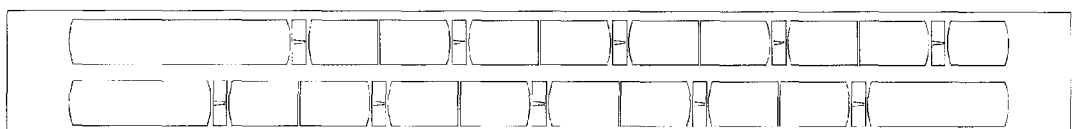
FIG. 19B is a top view of a magnetic head having a two-dimensional array of channels in accordance with another embodiment of the present disclosure.

The various embodiments of heads of the present disclosure and methods of making the same may be used to form a head having a two-dimensional array of channels or magnetic heads 190, 192, such as those illustrated in FIGS. 19A and 19B. A two-dimensional array of channels or magnetic heads may make up a compound magnetic head, for example, including write gaps (or write heads), read gaps (or read heads), and/or erase gaps (or erase heads). In further embodiments, a two-dimensional array of channels or magnetic heads may include data read/write heads and format or servo read/write heads. As illustrated in FIG. 19A, the two-dimensional array of channels or magnetic heads may be substantially aligned, such that the pairs of channels or magnetic heads are aligned with the same servo or data band in the down-track direction. Alternatively, as illustrated in FIG. 19B, the two-dimensional array of channels or magnetic heads may not be aligned in the down-track direction. It is recognized that any suitable pattern of two-dimensional arrays of channels or magnetic heads may be used and are within the spirit and scope of the present disclosure. As described above, each of the channels may be independently driven.

In one embodiment, a head in accordance with the various embodiments of the present disclosure can be used for recording magnetic transitions on magnetic media, for example, by supplying a current through the coil conductor layer to create a magnetic field in the magnetic layers. For example, a head in accordance with the various embodiments of the present disclosure can be used to format or verify magnetic media, e.g., write/read servo tracks to/from the magnetic media. In other embodiments, as stated above, a head in accordance with the various embodiments of the present disclosure can be used to read/write data tracks. Additionally, as stated above, each of the channels of a head in accordance with the various embodiments of the present disclosure can be driven simultaneously or independently. Independently driven channels provide additional advantages to a head in accordance with the various embodiments of the present disclosure, some of which are described below, and others of which will be recognized by those skilled in the art. Other embodiments of heads may include compound systems of such heads, for example, with some heads being used as servo verify heads and some heads being uses as pre-erase heads. Further discussion on such compound heads may be found in U.S. Pat. No. 7,283,317, issued Oct. 16, 2007, titled "Apparatus and Methods for Pre-Erasing During Manufacture of Magnetic Tape," which is hereby incorporated by reference herein in its entirety.

Figure 20:
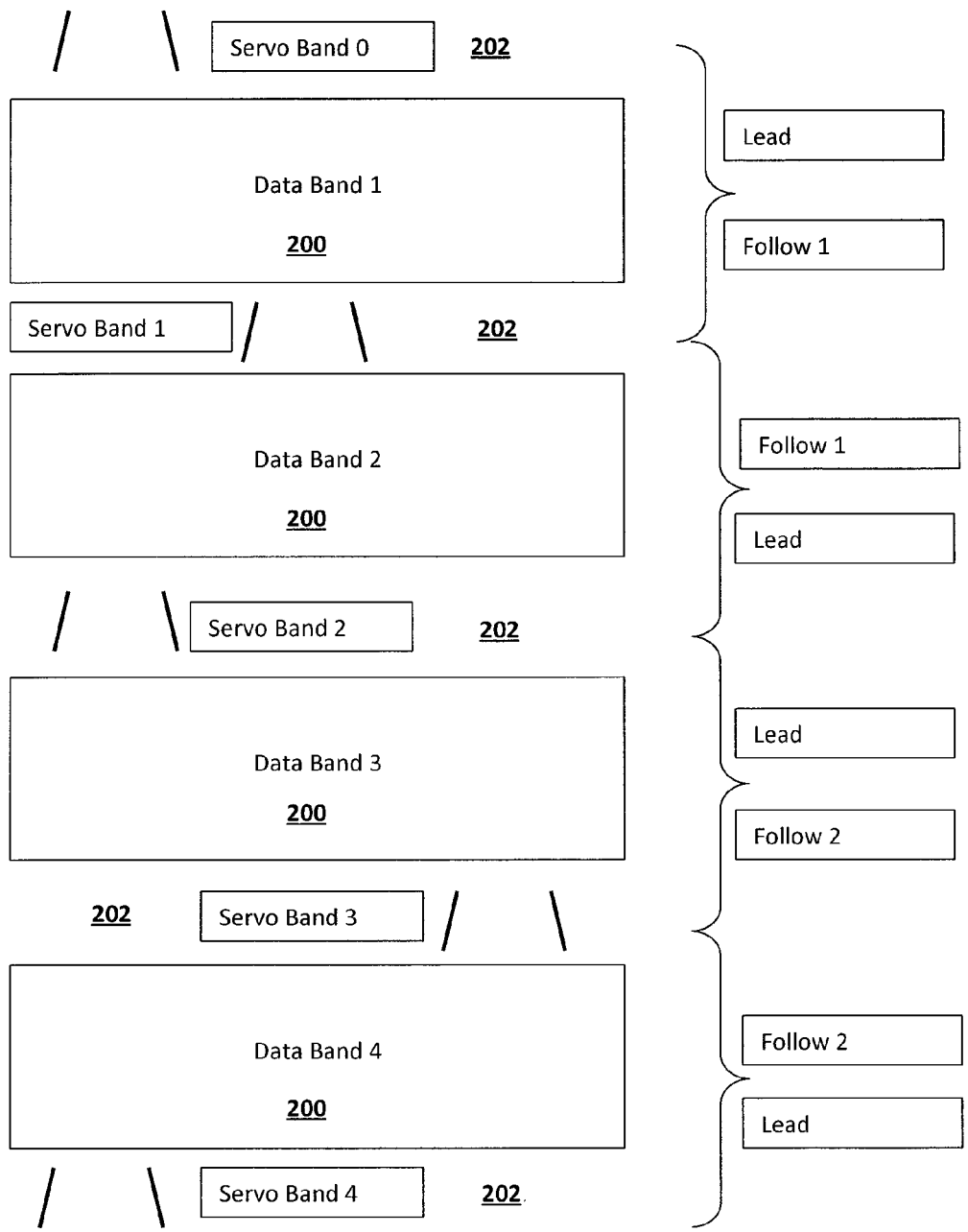
FIG. 20 is a schematic view of a standard LTO format.

In further embodiments, a head in accordance with the various embodiments of the present disclosure allows for complex tape formatting techniques, such as un-staggered servo bands that can linearly encode for the data band that lies in between each pair of servo tracks. In a standard LTO format system, five bands are staggered such that each pair of servo bands has a unique stagger as compared to any other pair of servo bands. This format is illustrated in FIG. 20, schematically shown in a view looking at the head through the tape; a tape view would be the mirror image of FIG. 20. As shown in FIG. 20, each data band 200 is bounded by a pair of servo bands 202, each pair having a unique stagger. For example, servo band 0 and servo band 1 have a lead/follow 1 stagger, servo band 1 and servo band 2 have a follow 1/lead stagger, servo band 2 and servo band 3 have a lead/follow 2 stagger, and servo band 3 and servo band 4 have a follow 2/lead stagger. The unique staggers are used to encode for the four data bands 200 of the standard LTO format. A staggered servo technique may be printed into the gap pattern during format head manufacture. However, it is highly unlikely that for servo systems with a greater number of servo bands, for example, 9, 13, or 17 servo bands, that a physical stagger on the head proper will be a suitable choice.

Figure 21:
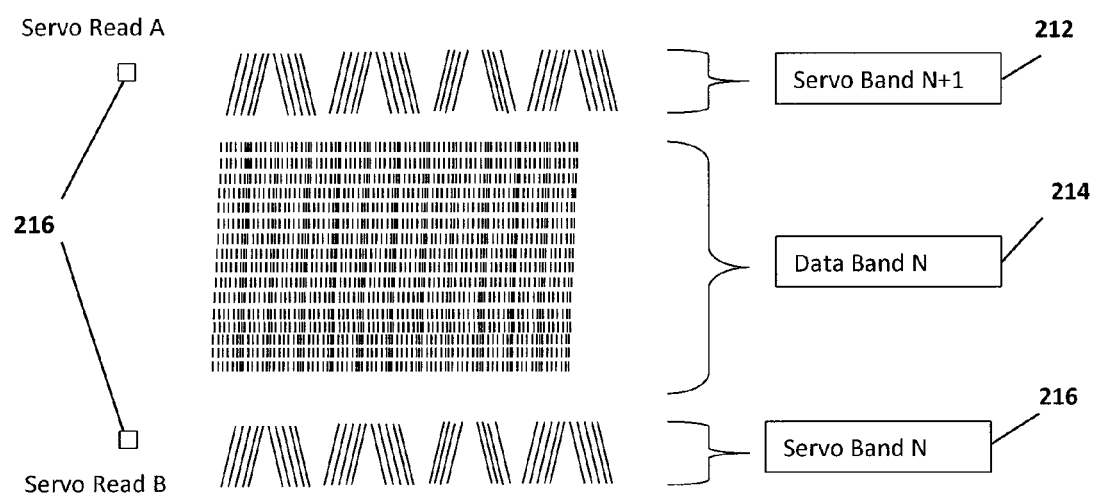
FIG. 21 is a top view of a data band between two servo bands.

FIG. 21 illustrates two servo bands 210, 212 that lie on either side of a data band 214. The number of data tracks within the data band 214 will depend on how many positions the timing based servo encodes and is a matter of design choice. Servo read heads A and B 216 are positioned to read the servo tracks of servo bands 212 and 210, respectively. This provides redundancy. Data read/write heads may be positioned over the data band 214 region on the same head slider system as servo reads A and B 216. Hence, the position of the servo read heads A and B 216 provides the position of the data read/write heads. In high speed systems, including those developed in the future, there can be a large number of servo bands as well as a relatively higher frequency content of the servo signal as compared to currently available products. The head-to-tape interface and spacing could become more critical, the inductance for the head may need to be lower to write at higher frequencies, the head efficiency may need to be greater, and the moment density of the main film 152 that carries the gaps may need to be higher.

Figure 22:
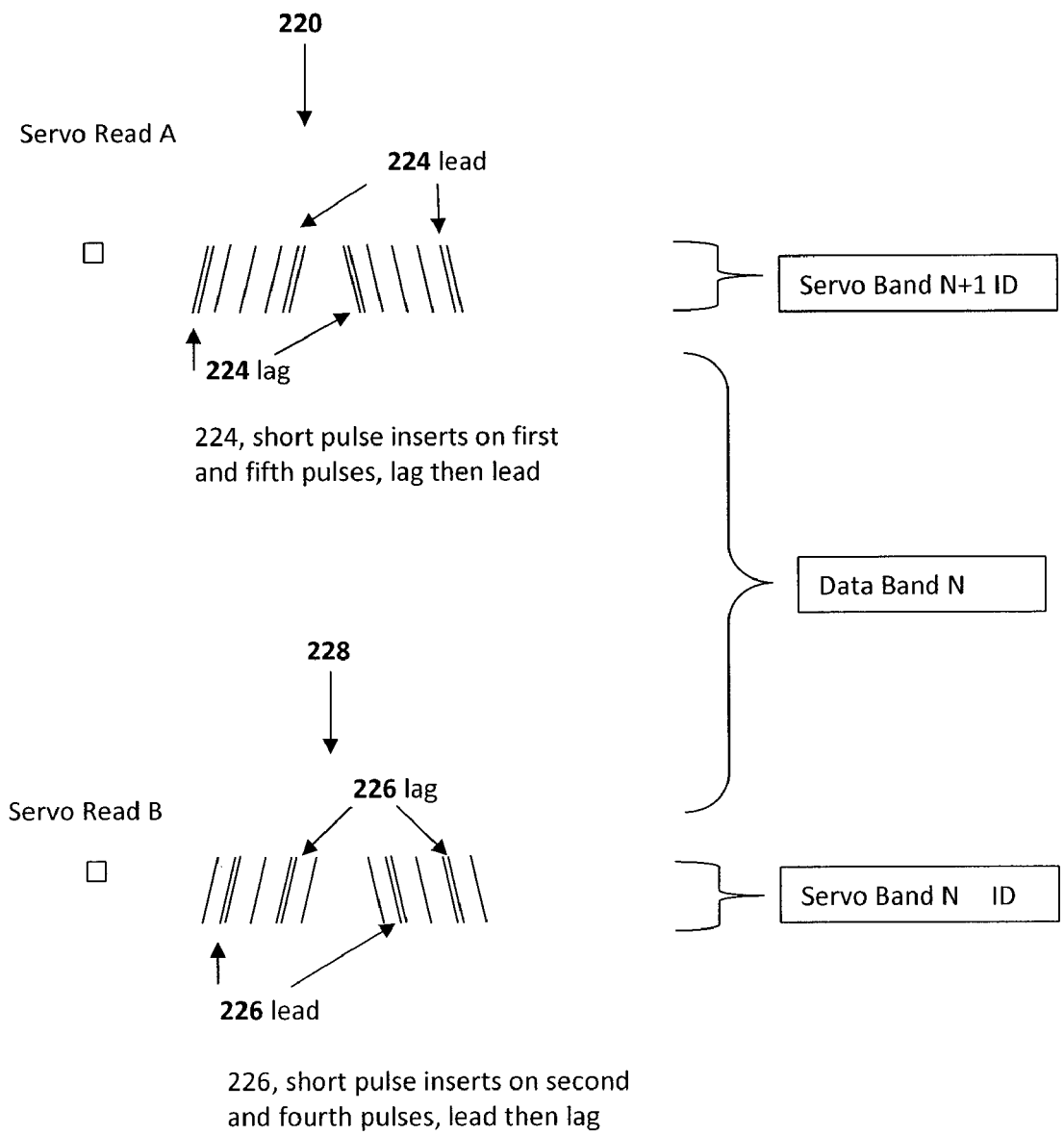
FIG. 22 is a top view of two servo bands encoded unique data in the servo pulse groups using a magnetic head in accordance with one embodiment of the present disclosure.

As a result of the above factors, in one embodiment of the present disclosure, it may be desirable to make a non-staggered array of head elements for a given head bump line. It may further be desirable, in accordance with one embodiment of the present disclosure, regardless of the servo track or data band encoding scheme, to address the servo head elements or channels independently in order to encode the servo bands and thus, the data band identifications. In the exemplary embodiment of FIG. 22, the servo signals are repeated at a certain frequency in groups of pulses, or frames 220, to average the ratios of the time-based signals. According to the various embodiments of the present disclosure, it is further possible to encode data in the servo band. One such data encoding is illustrated in FIG. 22, wherein the servo format band identification is encoded using the first and fifth short pulse 224 of the pulse group 220 of servo band N+1 and the second and fourth short pulses 226 of the pulse group 228 of servo band N. As such, each servo band includes a unique servo band identification encoded therein. These unique servo band identifications can be further used to determine data band identification. For example, as illustrated in FIG. 22, data band N may be identified by being bound by servo band N having short pulses 226 and servo band N+1 having short pulses 224. The encoding illustrated in FIG. 22 is exemplary and is not limiting. One advantage of having an equal lead and equal lag pulse in the same frame is that the time base signal temporal signature will average out the same as if no extra pulses were used at all. In this way, data can be encoded without affecting, or substantially affecting, the fundamental timing signature. Other ways of preserving the timing based signature would be to use extra pulse codes after the timing frame, with these extra pulses being ignored for timing purposes and only attended to for other information, such as manufactures information or servo and data band identification information. Other methods of encoding servo band identification in a unique manner may be used and are all within the spirit and scope of the present disclosure, as the head allows for them all to be used depending on the servo channel requirements and specific designs. The more servo bands there are, the more complex the encoding may be. In accordance with the present disclosure, using independently addressable servo bands, encoding can be placed electronically, and electronic encoding allows each head element to be substantially physically identical to one another. While the figures show static transition positions, it is entirely possible to use frequency based servo band identification schemes, and such frequency based servo band identification schemes are within the spirit and scope of the present disclosure.

Figure 23:
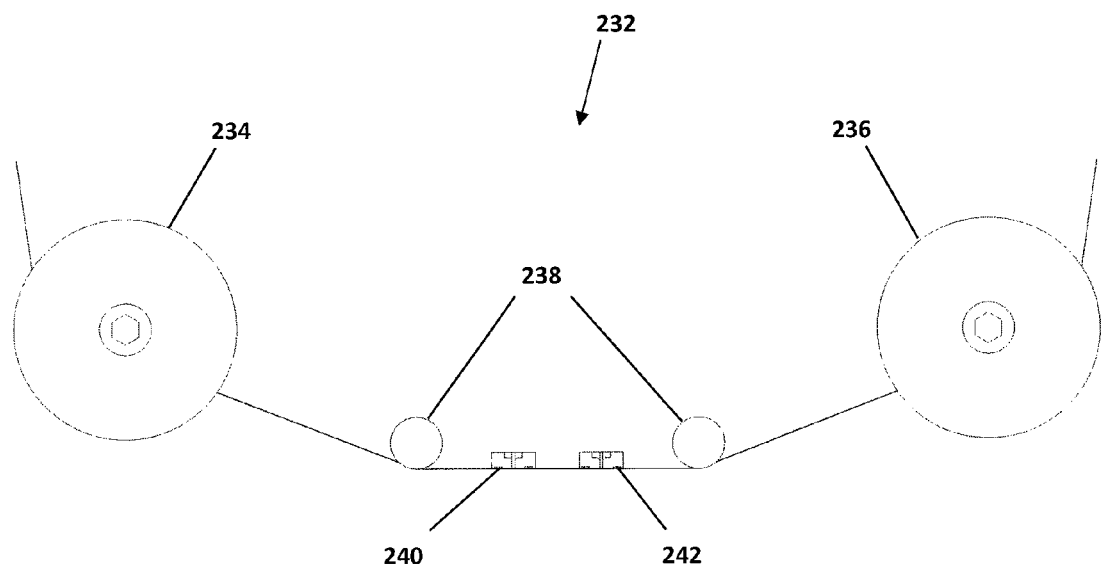
FIG. 23 is a schematic view of a tape transport system in accordance with an embodiment of the present disclosure.

FIG. 23 illustrates a tape transport system 232 in accordance with one embodiment of the present disclosure. The tape transport system 232 may include a supply reel 234 and a take-up reel 236. The tape transport system may further include tape guides 238 and/or other suitable tape guiding systems. A servo write head 240 can be positioned on the transport system 232, such that magnetic media guided through the transport system 232 from the supply reel 234 to the take-up reel 236 can be formatted, for example, with the timing-based servo formats described above or other suitable servo formats, including amplitude-based servo formats. In further embodiments, a servo verify head 242, or read head, may be positioned on the transport system 232 and can be used to verify the magnetic transitions, and thus the servo formats, written into the magnetic media by the servo write head 240. In some embodiments, as disclosed above, the servo write head 240 and servo verify head 242 may comprise a single compound head. It is recognized that the various embodiments of a magnetic head in accordance with the present disclosure may be suitable for data read/write heads, and tape transport systems for such data read/write heads may be similar to the transport system 232 illustrated in FIG. 23 and are within the spirit and scope of the present disclosure.

Although the present invention has been described with reference to preferred embodiments, persons skilled in the art will recognize that changes may be made in form and detail without departing from the spirit and scope of the invention. For example, each layer of the magnetic head may be made by one of a variety of different manufacturing processes or techniques, including but not limited to, deposition techniques, wet plating techniques, etching techniques, etc. In some embodiments, planarization may be used after any step, thereby, among other things, eliminating or substantially eliminating height differential in the resulting tape path and allowing for the application of an air skiving flat contour. Other embodiments may include, for example, a complete single coil turn that goes under and above the first magnetic layer, multiple complete coil turns, each having a portion above and below the first magnetic layer (which could make for a particularly efficient inductive read head), and embedding magneto-resistive read elements in each read channel for data read or format verification. As stated previously, the magnetic head of the present disclosure may be a single channel or multichannel magnetic head. Furthermore, two-dimensional arrays of channels or magnetic heads, including compound magnetic heads, including writers and readers and erase heads and including data heads and format head writers and readers are within the scope of the present disclosure.

I claim:

1. A magnetic head, comprising:
   a substrate having a substantially continuous surface generally parallel with a tape bearing surface;
   a first magnetic layer deposited over the substantially continuous surface of the substrate;
   an electrically conductive coil layer deposited over the first magnetic layer; and
   a second magnetic layer deposited over the electrically conductive coil layer, the second magnetic layer comprising at least one magnetic gap pattern;
   wherein the first and second magnetic layers are separated from the electrically conductive coil layer by at least one insulating layer; and
   wherein the first and second magnetic layers are connected through vias in the at least one insulating layer to form a closed magnetic flux path.

2. The magnetic head of claim 1, wherein the substrate comprises a plurality of conductive thru vias.

3. The magnetic head of claim 2, wherein the electrically conductive coil layer extends from and connects a first conductive thru via to a second conductive thru via.

4. The magnetic head of claim 3, wherein the at least one magnetic gap pattern comprises a single channel of the magnetic head.

5. A multichannel magnetic head comprising a plurality of single channels in accordance with the magnetic head of claim 4, wherein each of the plurality of channels is driven independently.

6. The multichannel magnetic head of claim 5, wherein the plurality of channels are magnetically isolated from one another.

7. A multichannel magnetic head comprising:
- a substrate having a substantially continuous surface generally parallel with a tape bearing surface; and
- a plurality of independent and magnetically isolated channels, each comprising:
  - a first magnetic layer deposited over the substantially continuous surface of the substrate;
  - an electrically conductive coil layer deposited over the first magnetic layer; and
  - a second magnetic layer deposited over the electrically conductive coil layer, the second magnetic layer comprising at least one magnetic gap pattern;
- wherein the first and second magnetic layers of one or more of the channels are separated from their respective electrically conductive coil layer by at least one insulating layer; and
- wherein the first and second magnetic layers of the one or more channels are connected through vias in the at least one insulating layer to form a closed magnetic flux path.

8. The multichannel magnetic head of claim 7, wherein the substrate comprises a plurality of conductive thru vias.

9. The multichannel magnetic head of claim 8, wherein the electrically conductive coil layer of one or more channels extends from and connects a first conductive thru via to a second conductive thru via associated with the respective channel.

10. The multichannel magnetic head of claim 7, wherein the at least one magnetic gap pattern comprises a timing-based magnetic gap pattern.

11. A servo format system, comprising:
- a supply reel, a take-up reel, a tape guiding system, and a magnetic head comprising:
  - a substrate having a substantially continuous surface generally parallel with a tape bearing surface;
  - a first magnetic layer deposited on the substantially continuous surface of the substrate;
  - a first insulating layer deposited on the first magnetic layer;
  - an electrically conductive coil layer deposited on the first magnetic layer;
  - a second insulating layer deposited on the electrically conductive coil layer; and
  - a second magnetic layer deposited on the electrically conductive coil layer, the second magnetic layer comprising at least one magnetic gap pattern;
  - wherein the first and second magnetic layers are connected through vias in the insulating layers to form a closed magnetic flux path.

12. The servo format system of claim 11, wherein the magnetic tape is passed over the magnetic head, from the supply reel to the take-up reel, and servo format patterns are written into the tape.

13. The servo format system of claim 12, wherein the servo format patterns are timing-based format patterns.

14. The servo format system of claim 11, wherein the magnetic recording head is a multichannel recording head having a plurality of channels that are magnetically isolated from one another.

* * * * *